United States Patent
Catanzaro et al.

(10) Patent No.: US 10,332,509 B2
(45) Date of Patent: *Jun. 25, 2019

(54) END-TO-END SPEECH RECOGNITION

(71) Applicant: Baidu USA, LLC, Sunnyvale, CA (US)

(72) Inventors: Bryan Catanzaro, Cupertino, CA (US); Jingdong Chen, Beijing (CN); Mike Chrzanowski, Sunnyvale, CA (US); Erich Elsen, Mountain View, CA (US); Jesse Engel, Oakland, CA (US); Christopher Fougner, Palo Alto, CA (US); Xu Han, Sunnyvale, CA (US); Awni Hannun, Palo Alto, CA (US); Ryan Prenger, Oakland, CA (US); Sanjeev Satheesh, Sunnyvale, CA (US); Shubhabrata Sengupta, Menlo Park, CA (US); Dani Yogatama, Sunnyvale, CA (US); Chong Wang, Redmond, WA (US); Jun Zhan, San Jose, CA (US); Zhenyao Zhu, Mountain View, CA (US); Dario Amodei, San Francisco, CA (US)

(73) Assignee: Baidu USA, LLC, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/358,102

(22) Filed: Nov. 21, 2016

(65) Prior Publication Data

US 2017/0148431 A1 May 25, 2017

Related U.S. Application Data

(60) Provisional application No. 62/260,206, filed on Nov. 25, 2015.

(51) Int. Cl.
*G10L 15/02* (2006.01)
*G10L 15/06* (2013.01)
(Continued)

(52) U.S. Cl.
CPC .......... *G10L 15/16* (2013.01); *G06N 3/0445* (2013.01); *G06N 3/084* (2013.01); *G10L 15/02* (2013.01);
(Continued)

(58) Field of Classification Search
None
See application file for complete search history.

(56) References Cited

U.S. PATENT DOCUMENTS 5,864,803 A   1/1999   Nussbaum
6,021,387 A   2/2000   Mozer et al.
(Continued)

OTHER PUBLICATIONS

Laurent C, Pereyra G, Brakel P, Zhang Y, Bengio Y. Batch Normalized Recurrent Neural Networks. stat. Oct. 2015;1050:5.*

(Continued)

*Primary Examiner* — Pierre Louis Desir
*Assistant Examiner* — Jonathan C Kim
(74) *Attorney, Agent, or Firm* — North Weber & Baugh LLP

(57) ABSTRACT

Embodiments of end-to-end deep learning systems and methods are disclosed to recognize speech of vastly different languages, such as English or Mandarin Chinese. In embodiments, the entire pipelines of hand-engineered components are replaced with neural networks, and the end-to-end learning allows handling a diverse variety of speech including noisy environments, accents, and different languages. Using a trained embodiment and an embodiment of a batch dispatch technique with GPUs in a data center, an end-to-end deep learning system can be inexpensively deployed in an online setting, delivering low latency when serving users at scale.

20 Claims, 18 Drawing Sheets

(51) Int. Cl.
G10L 15/14 (2006.01)
G10L 15/16 (2006.01)
G10L 15/183 (2013.01)
G10L 15/197 (2013.01)
G10L 25/21 (2013.01)
G10L 25/18 (2013.01)
G06N 3/04 (2006.01)
G06N 3/08 (2006.01)

(52) U.S. Cl.
CPC ............ *G10L 15/063* (2013.01); *G10L 15/14* (2013.01); *G10L 15/183* (2013.01); *G10L 15/197* (2013.01); *G10L 25/18* (2013.01); *G10L 25/21* (2013.01); *G10L 2015/0635* (2013.01)

(56) References Cited

U.S. PATENT DOCUMENTS

| | | | |
|---|---|---|---|
| 6,292,772 B1* | 9/2001 | Kantrowitz | G06F 17/275 382/230 |
| 7,035,802 B1 | 4/2006 | Rigazio et al. | |
| 2006/0031069 A1* | 2/2006 | Huang | G10L 13/08 704/243 |
| 2006/0229865 A1 | 10/2006 | Carlgren et al. | |
| 2010/0023331 A1 | 1/2010 | Duta et al. | |
| 2011/0173208 A1 | 7/2011 | Vogel | |
| 2013/0317755 A1* | 11/2013 | Mishra | G06F 19/22 702/20 |
| 2014/0257803 A1 | 9/2014 | Yu et al. | |
| 2015/0088508 A1 | 3/2015 | Bharadwaj et al. | |
| 2015/0186756 A1 | 7/2015 | Fujii | |
| 2015/0269933 A1 | 9/2015 | Yu et al. | |
| 2015/0309987 A1 | 10/2015 | Epstein et al. | |
| 2016/0321777 A1* | 11/2016 | Jin | G06F 9/5016 |
| 2017/0103752 A1* | 4/2017 | Senior | G10L 15/16 |

OTHER PUBLICATIONS

Sak, Haşim, et al. "Learning acoustic frame labeling for speech recognition with recurrent neural networks." Acoustics, Speech and Signal Processing (ICASSP), 2015 IEEE International Conference on. IEEE, 2015.*
Graves, Alex, et al. "Connectionist temporal classification: labelling unsegmented sequence data with recurrent neural networks." Proceedings of the 23rd international conference on Machine learning. ACM, 2006.*
Balkir (Balkir, Atilla Soner, Ian Foster, and Andrey Rzhetsky. "A distributed look-up architecture for text mining applications using mapreduce." Proceedings of 2011 International Conference for High Performance Computing, Networking, Storage and Analysis. ACM, 2011).*
Chen (Chen, Aitao, Fredric C. Gey, and Hailing Jiang. "Berkeley at NTCIR-2: Chinese, Japanese, and English IR experiments." NTCIR. 2001.).*
Balkir (Balkir, Atilla Soner, Ian Foster, and Andrey Rzhetsky. "A distributed look-up architecture for text mining applications using mapreduce." Proceedings of 2011 International Conference for High Performance Computing, Networking, Storage and Analysis. ACM, 2011) (Year: 2011).*
Chen (Chen, Aitao, Fredric C. Gey, and Hailing Jiang. "Berkeley at NTCIR-2: Chinese, Japanese, and English IR experiments." NTCIR. 2001.). (Year: 2001).*
Laurent C, Pereyra G, Brakel P, Zhang Y, Bengio Y. Batch Normalized Recurrent Neural Networks. stat. Oct. 2015;1050:5 (Year: 2015).*
Sak, Haşim, et al. "Learning acoustic frame labeling for speech recognition with recurrent neural networks." Acoustics, Speech and Signal Processing (ICASSP), 2015 IEEE International Conference on. IEEE, 2015. (Year: 2015).*
Graves, Alex, et al. "Connectionist temporal classification: labelling unsegmented sequence data with recurrent neural networks." Proceedings of the 23rd international conference on Machine learning. ACM, 2006. (Year: 2006).*
International Search Report dated Mar. 24, 2017, in International Patent Application No. PCT/US16/63661, filed Nov. 23, 2016 (15 pgs).
Written Opinion dated Mar. 24, 2017, in International Patent Application No. PCT/US16/63661, filed Nov. 23, 2016 (6 pgs).
International Search Report dated Feb. 7, 2017, in International Patent Application No. PCT/US16/63641, filed Nov. 23, 2016 (4 pgs).
Written Opinion dated Feb. 7, 2017, in International Patent Application No. PCT/US16/63641, filed Nov. 23, 2016 ( 7 pgs).
Gibiansky, A., "Speech Recognition With Neural Networks"; Machine-Learning; Publication. Apr. 23, 2014, <URL: http://andrew.gibiansky.com/blog/machine-learning/speech-recognition-neural-networks/>; pp. 1-20. (20 pgs).
EP 0865030 A2 (ATR Interpreting Telecommunications Research Laboratories) Sep. 16, 1998; p. 3, lines 35-50 (29 pgs).
CN 103591637 A (Changchun University of Technology) Feb. 19, 2014; see machine translation (16 pgs).
M. Schuster et al., "Bidirectional recurrent neural networks," IEEE Transactions on Signal Processing, 45(11):2673-2681, 1997 (9pgs).
F. Seide et al., "Conversational speech transcription using context-dependent deep neural networks," In Interspeech, pp. 437-440, 2011 (4pgs).
J. Shan et al., "Search by voice in mandarin chinese," In Interspeech, 2010 (5pgs).
H. Soltau et al., "Joint training of convolutional and non-convolutional neural networks," In ICASSP, 2014 (5pgs).
I. Sutskever et al., "On the importance of momentum and initialization in deep learning," In 30th International Conference on Machine Learning, 2013 (14pgs).
I. Sutskever et al., "Sequence to sequence learning with neural networks," 2014, http://arxiv.org/abs/1409.3215 (9pgs).
C. Szegedy et al., "Batch normalization: Accelerating deep network training by reducing internal covariate shift," abs/1502.03167, 2015, http://arxiv.org/abs/1502.03167,11pgs.
C. Szegedy et al., "Going deeper with convolutions," 2014 (9pgs).
R. Thakur et al., "Optimization of collective communication operations in mpich," International Journal of High Performance Computing Applications, 19:49-66, 2005 (17pgs).
K. Vesely et al., "Sequence-discriminative training of deep neural networks," In Interspeech, 2013 (5pgs).
A. Waibel et al., "Phoneme recognition using time-delay neural networks, â˜AˇI acoustics speech and signal processing," IEEE Transactions on Acoustics, Speech and Signal Processing, 37(3):328-338, 1989 (12pgs).
R. Williams et al., "An efficient gradient-based algorithm for online training of recurrent network trajectories," Neural computation, 2:490-501, 1990 (12pgs).
T. Yoshioka et al., "The ntt chime-3 system: Advances in speech enhancement and recognition for mobile multi-microphone devices," In IEEE ASRU, 2015 (1pg).
W. Zaremba et al., "Learning to execute," abs/1410.4615, 2014, http://arxiv.org/abs/1410.4615 (8pgs).
C. Laurent et al., "Batch normalized recurrent neural networks," abs/1510.01378, 2015. http://arxiv.org/abs/1510.01378 (9pgs).
Q. Le et al., "Building high-level features using large scale unsupervised learning," In International Conference on Machine Learning, 2012 (11pgs).
Y. LeCun et al., "Learning methods for generic object recognition with invariance to pose and lighting," In Computer Vision and Pattern Recognition, 2:97-104, 20004 (8pgs).
A. Maas et al., "Lexicon-free conversational speech recognition with neural networks," In NAACL, 2015 (10pgs).
Y. Miao et al., "EESEN: End-to-end speech recognition using deep rnn models and wfst-based decoding," In ASRU, 2015 (8pgs).
A. Mohamed et al., "Acoustic modeling using deep belief networks," IEEE Transactions on Audio, Speech, and Language Processing, (99), 2011 (10pgs).

(56) References Cited

OTHER PUBLICATIONS

A.S.N. Jaitly et al., "Application of pretrained deep neural networks to large vocabulary speech recognition," In Interspeech, 2012 (11pgs).
Nervana Systems. Nervana GPU, https://github.com/NervanaSystems/nervanagpu, Accessed: Nov. 6, 2015 (5pgs).
J. Niu, "Context-dependent deep neural networks for commercial mandarin speech recognition applications," In APSIPA, 2013 (5pgs).
V. Panayotov et al., "Librispeech: an asr corpus based on public domain audio books," In ICASSP, 2015 (5pgs).
Miao et al., "EESEN: End-to-End Speech Recognition Using Deep RNN Models and WFST-Based Decoding", <UR: https://arxiv.org/pdf/1507.08240v2.pdf>, (8 pgs).
Miao et al., "An empirical exploration of ctc acoustic models," in Proc. 2016 IEEE Int. Conf. Acoustics, Speech and Signal Processing, Shanghai, China, 2016, (5 pgs).
Zweig et al., "Advances in all-neural speech recognition," <UR: https://arxiv.org/pdf/1609.05935.pdf>, (5 pgs).
O. Abdel-Hamid et al., "Applying convolutional neural networks concepts to hybrid nn-hmm model for speech recognition," In ICASSP, 2012 (4pgs).
D. Bandanau et al., "Neural machine translation by jointly learning to align and translate," In ICLR, 2015 (15pgs).
D. Bandanau et al., "End-to-end attention-based large vocabulary speech recognition." abs/1508.04395, 2015. http://arxiv.org/abs/1508.04395 (8pgs).
J. Barker et al., The third 'CHiME' speech separation and recognition challenge: Dataset, task and baselines. 2015. Submitted to IEEE 2015 Automatic Speech Recognition and Understanding Workshop (ASRU) (9pgs).
S. Baxter, "Modern GPU," https://nvlabs.github.io/moderngpu/ (3pgs).
Y. Bengio et al., "Curriculum learning," In International Conference on Machine Learning, 2009 (8pgs).
H. Bourlard et al., "Connectionist Speech Recognition: A Hybrid Approach," Kluwer Academic Publishers, Norwell, MA, 1993 (291pgs).
W. Chan et al., "Listen, attend, and spell," abs/1508.01211, 2015, http://arxiv.org/abs/1508.01211 (16pgs).
Chetlur et al., "cuDNN: Efficient primitives for deep learning," (9pgs).
J. Dean et al., "Large scale distributed deep networks," In Advances in Neural Information Processing Systems 25, 2012 (97pgs).
D. Ellis et al., "Size matters: An empirical study of neural network training for large vocabulary continuous speech recognition," In ICASSP 2:1013-1016, IEEE 1999 (4pgs).
E. Elsen, "Optimizing RNN performance," http://svail.github.io/rnn_perf. Accessed: Nov. 24, 2015 (18pgs).
M. J. Gales et al., "Support vector machines for noise robust ASR," In ASRU, pp. 205-2010, 2009 (4pgs).
A. Graves et al., "Connectionist temporal classification: Labelling unsegmented sequence data with recurrent neural networks," In ICML, pp. 369-376. ACM, 2006 (8pgs).
A. Graves et al., "Towards end-to-end speech recognition with recurrent neural networks," In ICML, 2014 (9pgs).
A. Graves et al., "Speech recognition with deep recurrent neural networks," In ICASSP, 2013 (5pgs).
H. H. Sak et al., "Long short-term memory recurrent neural network architectures for large scale acoustic modeling," In Interspeech, 2014 (5pgs).
A. Hannun et al., "Deep speech: Scaling up end-to-end speech recognition," 1412.5567, 2014. http://arxiv.org/abs/1412.5567 (12pgs).
A.Y. Hannun et al., "First-pass large vocabulary continuous speech recognition using bi-directional recurrent DNNs," abs/1408.2873, 2014. http://arxiv.org/abs/1408.2873, 7pgs.
R. Pascanu et al., "On the difficulty of training recurrent neural networks," abs/1211.5063, 2012, http://arxiv.org/abs/1211.5063 (9pgs).
P. Patarasuk et al., "Bandwidth optimal all-reduce algorithms for clusters of workstations," J. Parallel Distrib. Comput., 69(2):117-124, Feb. 2009 (24pgs).
R. Raina et al., "Large-scale deep unsupervised learning using graphics processors," In 26th International Conference on Machine Learning, 2009 (8pgs).
S. Renals et al., "Connectionist probability estimators in HMM speech recognition," IEEE Transactions on Speech and Audio Processing, 2(1):161-174, 1994 (13pgs).
T. Robinson et al., "The use of recurrent neural networks in continuous speech recognition," pp. 253-258, 1996 (26pgs).
T. Sainath et al., "Convolutional, long short-term memory, fully connected deep neural networks," In ICASSP, 2015 (5pgs).
T.N. Sainath et al, "Deep convolutional neural networks for LVCSR," In ICASSP, 2013 (5pgs).
H. Sak et al., "Fast and accurate recurrent neural network acoustic models for speech recognition," abs/1507.06947, 2015. http://arxiv.org/abs/1507.06947 (5pgs).
H. Sak et al., "Sequence discriminative distributed training of long shortterm memory recurrent neural networks," In Interspeech, 2014 (5pgs).
B. Sapp et al., "A fast data collection and augmentation procedure for object recognition," In AAAI Twenty-Third Conference on Artificial Intelligence, 2008 (7pgs).
Chilimbi et al., Project adam: Building an efficient and scalable deep learning training system. In USENIX Symposium on Operating Systems Design and Implementation,2014,13pg.
K. Cho et al., Learning phrase representations using rnn encoder-decoder for statistical machine translation. In EMNLP, 2014 (15pgs).
J. Chorowski et al., End-to-end continuous speech recognition using attention-based recurrent nn: First results. abs/1412.1602, 2015. http://arxiv.org/abs/1412.1602 (10pgs).
C. Cieri et al., The Fisher corpus: a resource for the next generations of speech-totext. In LREC, vol. 4, pp. 69-71, 2004 (3pgs).
A. Coates et al., "Text detection and character recognition in scene images with unsupervised feature learning," In International Conferenceon Document Analysis and Recognition, 2011 (6pgs).
A. Coates et al., "Deep learning with COTS HPC," In International Conference on Machine Learning, 2013 (9pgs).
G. Dahl et al., Large vocabulary continuous speech recognition with context-dependent DBN-HMMs. In Proc. ICASSP, 2011 (4pgs).
G. Dahl et al., "Context-dependent pre-trained deep neural networks for large vocabulary speech recognition," IEEE Transactions on Audio, Speech, and Language Processing, 2011 (13pgs).
K. Heafield et al., "Scalable modified Kneser-Ney language model estimation," In Proceedings of the 51st Annual Meeting of the Association for Computational Linguistics, Sofia, Bulgaria, 8 2013 (7pgs).
G. Hinton et al., "Deep neural networks for acoustic modeling in speech recognition," IEEE Signal Processing Magazine, Nov. 29:82-97, 2012 (27pgs).
S. Hochreiter et al., "Long short-term memory," Neural Computation, 9(8):1735-1780, 1997 (32pgs).
N. Jaitly et al.,"Vocal tract length perturbation (VTLP) improves speech recognition," In ICML Workshop on Deep Learning for Audio, Speech, and Language Processing, 2013, 5pp.
R. Jozefowicz et al., "An empirical exploration of recurrent network architectures," In ICML, 2015 (9pgs).
O. Kapralova et al., "A big data approach to acoustic model training corpus selection," In Interspeech, 2014 (5pgs).
K.Knowlton, "A fast storage allocator". Commun. ACM, 8(10):623-624, Oct. 1965 (3pgs).
T. Ko et al., Audio augmentation for speech recognition. In Interspeech, 2015 (4pgs).
A. Krizhevsky et al., "Imagenet classification with deep convolutional neural networks," In Advances in Neural Information Processing Systems 25, pp. 1106-1114, 2012 (9pgs).
Laurent C, Pereyra G, Brakel P, Zhang Y, Bengio Y. Batch Normalized Recurrent Neural Networks. stat. Oct. 2015;1050:5.) (9 pgs).
Peddinti, Vijayaditya, Daniel Povey, and Sanjeev Khudanpur. "A time delay neural network architecture for efficient modeling of long temporal contexts." INTERSPEECH. 2015. (5 pgs).

(56) References Cited

OTHER PUBLICATIONS

Collobert, Ronan, and Jason Weston. "A unified architecture for natural language processing: Deep neural networks with multitask learning." Proceedings of the 25th international conference on Machine learning. ACM, 2008. (8 pgs).

Non-Final Office Action dated Feb. 1, 2018, in U.S. Appl. No. 15/358,083 (53 pgs).

Response to Non-Final Office Action filed Jul. 2, 2018, in related U.S. Appl. No. 15/358,083 (29 pgs).

Respone to Final Office Action filed Dec. 19, 2018, in U.S. Appl. No. 15/358,083 (8 pgs).

Final Office Action dated Nov. 2, 2018, in U.S. Appl. No. 15/358,083 (24 pgs).

Sak et al.,"Fast and Accurate Recurrent Neural Network Acoustic Models for Speech Recognition." arXiv preprint arXiv: 1507.06947. Jul. 24, 2015. (5 pgs).

Notice of Allowance and Fee Due, dated Jan. 28, 2019, in U.S. Appl. No. 15/358,083 (10 pgs).

Notice of Allowance and Fee Due, dated Apr. 22, 2019, in U.S. Appl. No. 15/735,002 (10 pgs).

* cited by examiner

300

Compute mean and variance statistics of the pre-activations in a minibatch over the length of an utterance sequence, for both convolution layers and recurrent layers ─ 305

↓

Store a running average of the mean and variance for the neuron collected during training ─ 310

↓

Use the stored running average for evaluation in a deployed automatic speech recognition (ASR) system ─ 315

For a training set comprising a plurality of minibatches, each minibatch comprising a plurality of utterances, in a first training epoch, iterate through the training set in an increasing order of the length of the longest utterance in each minibatch ⟋ 505

After the first training epoch, use a random order for additional training ⟋ 510

```
┌─────────────────────────────────────────────────────────────┐
│ Stride, by taking a predetermined step size of q time slices, the │─ 605
│ input spectrograms at the first convolution layer of the model   │
└─────────────────────────────────────────────────────────────┘
                              │
                              ▼
┌─────────────────────────────────────────────────────────────┐
│ Use a model that employs an alphabet comprising non-        │─ 610
│ overlapping n-grams (e.g., bigrams) of characters from words │
└─────────────────────────────────────────────────────────────┘
```

┌─────────────────────────────────────────────────────┐
│ Employ a row convolution layer above one or more recurrent │ — 805
│ layers of a recurrent neural network (RNN) model │
└─────────────────────────────────────────────────────┘
                         ↓
┌─────────────────────────────────────────────────────┐
│ Obtain an activation of the row convolution layer using │ — 810
│ information from a recurrent layer at current time step and at │
│ least one future time step │
└─────────────────────────────────────────────────────┘
                         ↓
┌─────────────────────────────────────────────────────┐
│ Feed the obtained activation to a classifier for output prediction │ — 815
│ corresponding to current time step │
└─────────────────────────────────────────────────────┘

┌─────────────────────────────────────────────┐
│ Output from a RNN model a probability distribution over predicted characters corresponding to input utterances to a Connectionist Temporal Classification (CTC) layer │ ─ 1205
└─────────────────────────────────────────────┘
                      ↓
┌─────────────────────────────────────────────┐
│ Implement a graphics processing unit (GPU) based CTC loss function algorithm, the algorithm comprising parallel computation to process a forward matrix and a backward matrix generated during a forward pass and a backward pass respectively, the CTC loss function algorithm comprises one or more of the following approaches: ─ 1210
│
│ (a) for gradient computation, taking each column of the matrix generated from element-wise addition of the forward and backward matrices and doing a key-value reduction using the character as key ─ 1215
│
│ (b) mapping the forward and backward passes to corresponding CUDA kernels ─ 1220
│
│ (c) performing a key-value sort, the keys being the characters in the utterance label, and the values being the indices of each character in the utterance ─ 1225
└─────────────────────────────────────────────┘

FIG. 12

END-TO-END SPEECH RECOGNITION

CROSS-REFERENCE TO RELATED APPLICATION

This application claims the priority benefit under 35 USC § 119(e) to U.S. Prov. Pat. App. Ser. No. 62/260,206, filed on 25 Nov. 2015, entitled "Deep Speech 2: End-to-End Speech Recognition in English and Mandarin," and listing Bryan Catanzaro, Jingdong Chen, Michael Chrzanowski, Erich Elsen, Jesse Engel, Christopher Fougner, Xu Han, Awni Hannun, Ryan Prenger, Sanjeev Satheesh, Shubhabrata Sengupta, Dani Yogatama, Chong Wang, Jun Zhan, Zhenyao Zhu, and Dario Amodei as inventors. The aforementioned patent document is incorporated by reference herein in its entirety.

This application is related to co-pending and commonly assigned U.S. patent application Ser. No. 15/358,083, filed on even date herewith, entitled "DEPLOYED END-TO-END SPEECH RECOGNITION," and listing Bryan Catanzaro, Jingdong Chen, Michael Chrzanowski, Erich Elsen, Jesse Engel, Christopher Fougner, Xu Han, Awni Hannun, Ryan Prenger, Sanjeev Satheesh, Shubhabrata Sengupta, Dani Yogatama, Chong Wang, Jun Zhan, Zhenyao Zhu, and Dario Amodei as inventors. The aforementioned patent document is incorporated by reference herein in its entirety.

BACKGROUND

Technical Field

The present disclosure relates to speech recognition. More particularly, the present disclosure relates to systems and methods for end-to-end speech recognition and may be used for vastly different languages.

Description of the Related Art

Automatic Speech Recognition (ASR) is an inter-disciplinary sub-field of computational linguistics, which incorporates knowledge and research in the linguistics, computer science, and electrical engineering fields to develop methodologies and technologies that enables the recognition and translation of spoken language into text by computers and computerized devices, such as those categorized as smart technologies and robotics.

Neural networks emerged as an attractive acoustic modeling approach in ASR in the late 1980s. Since then, neural networks have been used in many aspects of speech recognition such as phoneme classification, isolated word recognition, and speaker adaptation. Many aspects of speech recognition have been taken over by a deep learning method involving long short term memory (LSTM) and recurrent neural network (RNN).

One of the challenges in speech recognition is the wide range of variability in speech and acoustics. It is challenging to building and tuning a speech recognizer adaptive to support multiple language applications with acceptable accuracy, especially when the involved languages are quite different, such as English and Mandarin.

Accordingly, what is needed are improved systems and methods for end-to-end speech recognition.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3 depicts a method of sequence-wise batch normalization according to embodiments of the present disclosure.

FIG. 5 depicts a method for training a RNN model using a curriculum learning strategy according to embodiments of the present disclosure.

FIG. 6 depicts a method for training a RNN model using bi-graphemes segmentation for output transcription according to embodiments of the present disclosure.

FIG. 8 depicts a method for audio transcription with a unidirectional RNN model according to embodiments of the present disclosure.

FIG. 12 depicts a method for GPU implementation of the CTC loss function according to embodiments of the present disclosure.

DETAILED DESCRIPTION OF THE PREFERRED EMBODIMENTS

Figure 1:
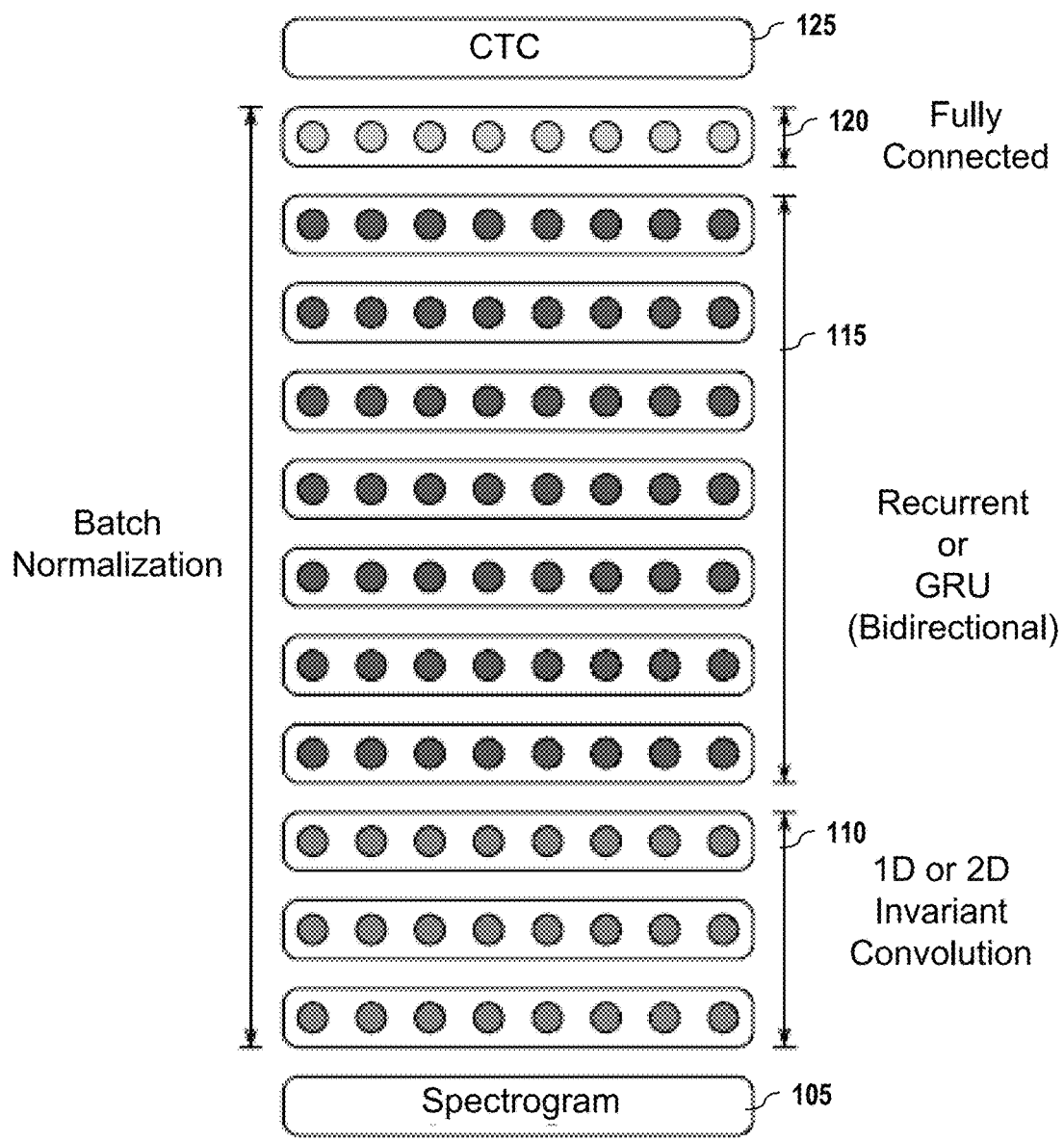
FIG. 1 ("FIG. 1") depicts an architecture for an end-to-end deep learning model according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Furthermore, the use of certain terms in various places in the specification is for illustration and should not be construed as limiting. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using specific embodiments. Accordingly, neither these experiments nor their results shall be used to limit the scope of the disclosure of the current patent document.

1. Introduction

Decades worth of hand-engineered domain knowledge has gone into current state-of-the-art automatic speech recognition (ASR) pipelines. A simple but powerful alternative solution is to train such ASR models end-to-end, using deep learning to replace most modules with a single model. In this patent document, embodiments of speech systems that exemplify the major advantages of end-to-end learning are presented herein. Embodiments of the systems (which may be referred to generally as Deep Speech 2, Deep Speech 2 ASR, Deep Speech 2 ASR pipeline, or DS2) approach or exceed the accuracy of Amazon Mechanical Turk human workers on several benchmarks, work in multiple languages with little modification, and are deployable in a production setting. These embodiments represent a significant step towards a single ASR system that addresses the entire range of speech recognition contexts handled by humans. Since embodiments are built on end-to-end deep learning, a spectrum of deep learning techniques can be deployed. The deep learning techniques may include capturing large training sets, training larger models with high performance computing, and methodically exploring the space of neural network architectures. It is shown that through these techniques, error rates of some previous end-to-end system may be reduced for English by up to 43%, and can also recognize Mandarin speech with high accuracy.

One of the challenges of speech recognition is the wide range of variability in speech and acoustics. As a result, modern ASR pipelines are made up of numerous components including complex feature extraction, acoustic models, language and pronunciation models, speaker adaptation, etc. Building and tuning these individual components makes developing a new speech recognizer very hard, especially for a new language. Indeed, many parts do not generalize well across environments or languages, and it is often necessary to support multiple application-specific systems in order to provide acceptable accuracy. This state of affairs is different from human speech recognition: people have the innate ability to learn any language during childhood, using general skills to learn language. After learning to read and write, most humans can transcribe speech with robustness to variation in environment, speaker accent, and noise, without additional training for the transcription task. To meet the expectations of speech recognition users, it is believed that a single engine must learn to be similarly competent; able to handle most applications with only minor modifications and able to learn new languages from scratch without dramatic changes. Embodiments of end-to-end systems presented herein put this goal within reach, allowing the systems to approach or exceed the performance of human workers on several tests in two very different languages: Mandarin and English.

Since embodiments of the Deep Speech 2 (DS2) systems are an end-to-end deep learning system, performance gains may be achieved by focusing on three components: the model architecture, large labeled training datasets, and computational scale. This approach has also yielded great advances in other application areas such as computer vision and natural language. This patent document details the contributions to these three areas for speech recognition, including an extensive investigation of model architectures and the effect of data and model size on recognition performance. In particular, numerous experiments are described with neural networks trained with a Connectionist Temporal Classification (CTC) loss function to predict speech transcriptions from audio. Networks comprising many layers of recurrent connections, convolutional filters, and nonlinearities were considered, as well as the impact of a specific instances of Batch Normalization (which may be referred to generally as BatchNorm) applied to RNNs. Not only were embodiments of networks found that produced much better predictions than those previously, but also embodiments of recurrent models were found that can be deployed in a production setting with little or no significant loss in accuracy.

Beyond the search for better model architecture, deep learning systems benefit greatly from large quantities of training data. Embodiments of a data capturing pipeline are described herein, which have enabled creating larger datasets than what has typically been used to train speech recognition systems. In embodiments, an English speech system was trained on 11,940 hours of speech, while a Mandarin system was trained on 9,400 hours. In embodiments, data synthesis was used to further augment the data during training.

Training on large quantities of data usually requires the use of larger models. Indeed, embodiments presented herein have many more parameters than those used in some previous systems. Training a single model at these scales can involve tens of exaFLOPs, where 1 exaFLOPs=$10^{18}$ Floating-point Operations, that would require 3-6 weeks to execute on a single graphics processing unit (GPU). This makes model exploration a very time-consuming exercise, so a highly optimized training system that uses 8 or 16 GPUs was built to train one model. In contrast to previous large-scale training approaches that use parameter servers and asynchronous updates, a synchronous stochastic gradient descent (SGD) was used because it was easier to debug while testing new ideas, and also converged faster for the same degree of data parallelism. Optimization are described herein for a single GPU as well as improvements to scalability for multiple GPUs, which were used, in embodiments, to make the entire system more efficient. In embodiments, optimization techniques typically found in High Performance Computing were employed to improve scalability. These optimizations include a fast implementation of the CTC loss function on the GPU and a custom memory allocator. Carefully integrated compute nodes and a custom implementation of all-reduce were also used to accelerate inter-GPU communication. Overall the system sustained approximately 50 teraFLOP/second when trained on 16 GPUs. This amounts to 3 teraFLOP/second per GPU which is about 50% of peak theoretical performance. This scalability and efficiency cuts training times down to 3 to 5 days, allowing iterating more quickly on models and datasets.

Embodiments of the system were benchmarked on several publicly-available test sets and the results are compared to a previous end-to-end system. A goal is to eventually reach human-level performance not only on specific benchmarks, where it is possible to improve through dataset-specific tuning, but on a range of benchmarks that reflects a diverse set of scenarios. To that end, the performance of human workers was also measured on each benchmark for comparison. It was found that embodiments of the Deep Speech 2 system outperformed humans in some commonly-studied benchmarks and has significantly closed the gap in much harder cases. In addition to public benchmarks, the performance of a Mandarin embodiment of the system on internal datasets that reflect real-world product scenarios is also shown.

Deep learning systems can be challenging to deploy at scale. Large neural networks are computationally expensive to evaluate for each user utterance, and some network architectures are more easily deployed than others. Through model exploration, embodiments of high-accuracy, deployable network architectures were achieved and are described herein. In embodiments, a batching scheme suitable for GPU hardware (which may be generally referred to as Batch Dispatch) was also developed and employed that leads to an efficient, real-time implementation of an embodiment of the Mandarin engine on production servers. The implementation embodiment achieved a 98th percentile compute latency of 67 milliseconds, while the server was loaded with 10 simultaneous audio streams.

The remainder of this portion of this patent document is as follows. It begins with some general background information in deep learning, end-to-end speech recognition, and scalability in Section 2. Section 3 describes embodiments of the architectural and algorithmic improvements to embodiments of the model, and Section 4 explains examples of how to efficiently compute them. Also discussed herein in Section 5 is the training data and steps taken to further augment the training set. An analysis of results for embodiments of the DS2 system in English and Mandarin is presented in Section 6. Section 7 provides a description of the steps to deploy an embodiment of DS2 to real users.

2. Background

Feed-forward neural network acoustic models were explored more than 20 years ago. Recurrent neural networks and networks with convolution were also used in speech recognition around the same time. More recently, deep neural networks (DNNs) have become a fixture in the ASR pipeline with almost all state-of-the-art speech work containing some form of deep neural network. Convolutional networks have also been found beneficial for acoustic models. Recurrent neural networks, typically LSTMs, are just beginning to be deployed in state-of-the art recognizers and work well together with convolutional layers for the feature extraction. Models with both bidirectional and unidirectional recurrence have been explored as well.

End-to-end speech recognition is an active area of research, showing compelling results when used to re-score the outputs of a deep neural network (DNN)-hidden Markov model (HMM) (DNN-HMM) and standalone. Two methods are currently typically used to map variable length audio sequences directly to variable length transcriptions. The RNN encoder-decoder paradigm uses an encoder RNN to map the input to a fixed-length vector and a decoder network to expand the fixed-length vector into a sequence of output predictions. Adding an attentional mechanism to the decoder greatly improves performance of the system, particularly with long inputs or outputs. In speech, the RNN encoder-decoder with attention performs well both in predicting phonemes or graphemes.

The other commonly used technique for mapping variable-length audio input to variable-length output is the CTC loss function coupled with an RNN to model temporal information. The CTC-RNN model performs well in end-to-end speech recognition with grapheme outputs. The CTC-RNN model has also been shown to work well in predicting phonemes, though a lexicon is still needed in this case. Furthermore, it has been necessary to pre-train the CTC-RNN network with a DNN cross-entropy network that is fed frame-wise alignments from a Gaussian Mixture Model (GMM)-hidden Markov model (HMM) (GMM-HMM) system. In contrast, embodiments of the CTC-RNN networks discussed herein were trained from scratch without the need of frame-wise alignments for pre-training.

Exploiting scale in deep learning has been central to the success of the field thus far. Training on a single GPU resulted in substantial performance gains, which were subsequently scaled linearly to two or more GPUs. Work in increasing individual GPU efficiency for low-level deep learning primitives is take advantage of. Building on the past work in using model-parallelism, data-parallelism, or a combination of the two, embodiments of a fast and highly scalable system for training deep RNNs in speech recognition was created.

Data has also been central to the success of end-to-end speech recognition, with over 7000 hours of labeled speech used in prior approaches. Data augmentation has been highly effective in improving the performance of deep learning in computer vision. This has also been shown to improve speech systems. Techniques used for data augmentation in speech range from simple noise addition to complex perturbations such as simulating changes to the vocal tract length and rate of speech of the speaker.

In embodiments, existing speech systems can also be used to bootstrap new data collection. In one approach, one speech engine was used to align and filter a thousand hours of read speech. In another approach, a heavy-weight offline speech recognizer was used to generate transcriptions for tens of thousands of hours of speech. This is then passed through a filter and used to re-train the recognizer, resulting in significant performance gains. Inspiration is draw from these approaches in bootstrapping larger datasets and data augmentation to increase the effective amount of labeled data for the system.

3. Embodiments of Model Architectures

A simple multi-layer model with a single recurrent layer cannot exploit thousands of hours of labelled speech. In order to learn from datasets this large, the model capacity is increased via depth. In embodiments, architectures with up to 11 layers, including many bidirectional recurrent layers and convolutional layers, were explored. These models have nearly 8 times the amount of computation per data example as the models in prior approaches making fast optimization and computation critical.

In embodiments, to optimize these models successfully, Batch Normalization for RNNs and a novel optimization curriculum, called SortaGrad, are used. In embodiments, long strides between RNN inputs are also exploited to reduce computation per example by a factor of 3. This is helpful for both training and evaluation, though requires some modifications in order to work well with CTC. Finally, though many of the research results were based upon embodiments that used bidirectional recurrent layers, it is found that excellent models exist using only unidirectional recurrent layers—a feature that makes such models much easier to deploy. Taken together these features allow tractably optimizing deep RNNs and some embodiments improve performance by more than 40% in both English and Mandarin error rates over the smaller baseline models.

3.1 Preliminaries

FIG. 1 shows an exemplary architecture for an end-to-end deep learning system according to embodiments of the present disclosure. In the depicted embodiment, the architecture 100 comprises a recurrent neural network (RNN) model trained to ingest speech spectrograms 105 and generate text transcriptions. In embodiments, the model 100 comprises several layers including one or more convolutional layers 110, followed by one or more recurrent layers (which may be gated recurrent unit (GRU) layers) 115, followed by one or more fully connected layers 120. The convolutional layers may be invariance convolution layers. For example, convolution layers may both in the time and frequency domain (2D invariance) and in the time (or frequency) only domain (1D invariance).

In embodiments, the architecture of the DS2 system depicted in FIG. 1 was used to train on both English and Mandarin speech. In embodiments, variants of this architecture may be used. For example, in embodiments, the number of convolutional layers was varied from 1 to 3 and the number of recurrent or GRU layers was varied from 1 to 7.

In embodiments, the RNN model may be trained using one or more Connectionist Temporal Classification (CTC) layers 125. The CTC layer may include a softmax layer. In embodiments, Batch Normalization (BatchNorm) is used for one or more minibatches of utterances in the convolutional layer(s) 110, the recurrent layers 115, and/or the fully connected layer(s) 120 to accelerate training for such networks since they often suffer from optimization issues. A minibatch is a collection of utterances that may be grouped together according to one or more criteria and are processed together as a group or batch. In embodiments, the input audio may be normalized to make the total power consistent among the one or more minibatches to accelerate training the model or set of models. The details of Batch Normalization are described in section 3.2.

Figure 2:
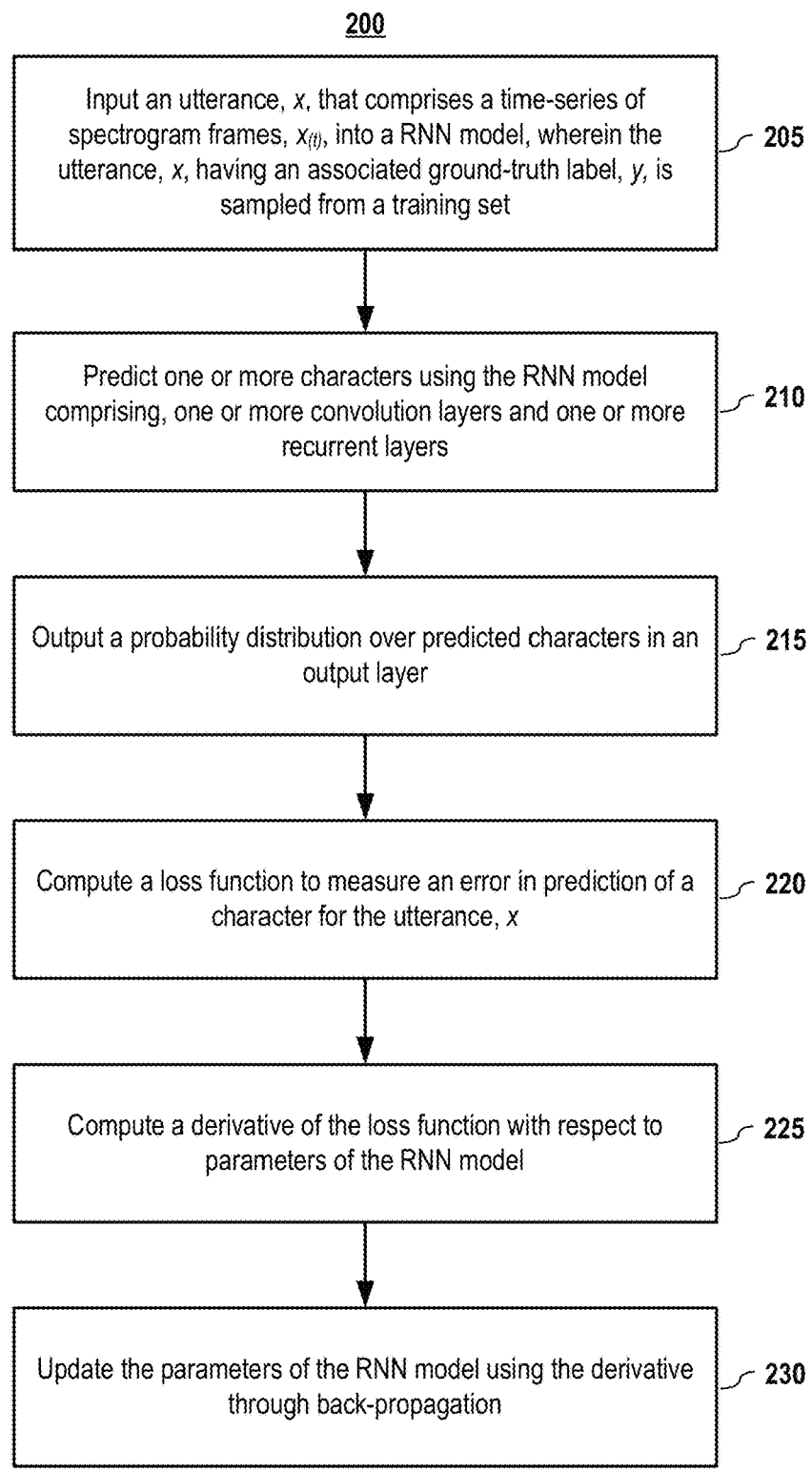
FIG. 2 depicts methods for training the deep learning model according to embodiments of the present disclosure.

FIG. 2 depicts a method for training an RNN model according to embodiments of the present disclosure. Let a single utterance $x^{(i)}$ and a paired ground truth label $y^{(i)}$ be sampled from a training set $X=\{(x^{(1)}, y^{(1)}), (x^{(2)}, y^{(2)}), \ldots\}$. Each utterance, $x^{(i)}$, is a time-series of length $T^{(i)}$ where every time-slice is a vector of audio features, $x_t^{(i)}$, $t=0, \ldots, T^{(i)}-1$. A spectrogram of power normalized audio clips is used as the features to the system, so $x_{t,p}^{(i)}$ denotes the power of the p'th frequency bin in the audio frame at time t. A goal of the RNN is to convert an input sequence $x^{(i)}$ into a final transcription $y^{(i)}$. For notational convenience, the superscripts are dropped and x is used to denote a chosen utterance and y the corresponding label.

In embodiments, the utterance, x, comprising a time-series of spectrogram frames, $x_{(t)}$, is inputted (205) into a recurrent neural network (RNN) model, wherein the utterance, x, and an associated label, y, are sampled from a training set.

The RNN model outputs of graphemes of each language. In embodiments, at each output time-step t, the RNN makes a prediction (210) over characters, $p(l_t|x)$, where $l_t$ is either a character in the alphabet or the blank symbol. In English, it $l_t \in \{a, b, c, \ldots, z, \text{space}, \text{apostrophe}, \text{blank}\}$, where the apostrophe as well as a space symbol have been added to denote word boundaries. For a Mandarin system, the network outputs simplified Chinese characters. This is described in more detail in Section 3.9.

The hidden representation at layer/is given by $h^l$ with the convention that $h^0$ represents the input x. In embodiments, the bottom of the network is one or more convolutions over the time dimension of the input. In embodiments, for a context window of size c, the i-th activation at time-step t of the convolutional layer is given by:

$$h_{t,i}^l = f(\omega_i^l \circ h_{t-c:t+c}^{l-1}) \qquad (1)$$

where $\circ$ denotes the element-wise product between the i-th filter and the context window of the previous layers activations, and f denotes a unary nonlinear function. In embodiments, a clipped rectified-linear (ReLU) function $\sigma(x)=\min\{\max\{x,0\}, 20\}$ is used as the nonlinearity. In embodiments, in some layers, usually the first, are sub-sampled by striding the convolution by s frames. The goal is to shorten the number of time-steps for the recurrent layers above.

In embodiments, following the convolutional layers (110) are one or more bidirectional recurrent layers (115), which may be directional recurrent layers or gated recurrent units (GTUs). The forward in time $\overrightarrow{h}_t^l$ and backward in time $\overleftarrow{h}_t^l$ recurrent layer activations are computed as:

$$\overrightarrow{h}_t^l = g(h_t^{l-1}, \overrightarrow{h}_{t-1}^l)$$

$$\overleftarrow{h}_t^l = g(h_t^{l-1}, \overleftarrow{h}_{t+1}^l) \qquad (2)$$

The two sets of activations are summed to form the output activations for the layer $h^l = \overrightarrow{h}^l + \overleftarrow{h}^l$. In embodiments, the function $g(\bullet)$ can be the standard recurrent operation:

$$\overrightarrow{h}_t^l = f(W^l h_t^{l-1} + U^l \overrightarrow{h}_{t-1}^l + b^l) \qquad (3)$$

where $W^l$ is the input-hidden weight matrix, $U^l$ is the recurrent weight matrix, $b^l$ is a bias term, and $W^l h_t^{l-1}$ represents pre-activations. In embodiments, the input-hidden weights are shared for both directions of the recurrence. In embodiments, the function g (•) can also represent more complex recurrence operations, such as Long Short-Term Memory (LSTM) units and gated recurrent units (GRUs).

In embodiments, after the bidirectional recurrent layers, one or more fully connected layers (120) are applied with:

$$h_t^l = f(W^l h_t^{l-1} + b^l) \qquad (4)$$

In embodiments, the output layer L is a softmax layer computing (215) a probability distribution over characters given by:

$$p(\ell_t = k \mid x) = \frac{\exp(w_k^L \cdot h_t^{L-1})}{\sum_j \exp(w_j^L \cdot h_t^{L-1})} \qquad (5)$$

where k represents one character in the alphabet (which includes the blank symbol).

In embodiments, the model is trained using a CTC loss function (125). Given an input-output pair (x, y) and the current parameters of the network θ, the loss function $\mathcal{L}$(x, y; θ) and its derivative with respect to the parameters of the network $\nabla_\theta \mathcal{L}$(x, y; θ) are computed (220). This derivative is then used to update (230) the network parameters through the backpropagation through time algorithm.

In the following subsections, the architectural and algorithmic improvements are described. Unless otherwise stated these improvements are language agnostic. Results are reported on an English speaker held out development set, which is a dataset containing 2048 utterances of primarily read speech. Embodiments of models are trained on datasets described in Section 5. Word Error Rate (WER) for the English system and Character Error Rate (CER) for the Mandarin system are reported. In both cases a language model is integrated in a beam search decoding step as described in Section 3.8.

3.2 Batch Normalization for Deep RNNs

To efficiently scale embodiments of the model as the training set is scaled, the depth of the networks is increased by adding more hidden layers, rather than making each layer larger. Previous work has examined doing so by increasing the number of consecutive bidirectional recurrent layers. In embodiments, Batch Normalization (which may be referred to generally as BatchNorm) was explored as a technique to accelerate training for such networks since they often suffer from optimization issues.

Recent research has shown that BatchNorm improves the speed of convergence of recurrent nets, without showing any improvement in generalization performance. In contrast, it is demonstrated in embodiments of the models herein that when applied to very deep networks of simple RNNs on large data sets, batch normalization substantially improves final generalization error while greatly accelerating training.

In embodiments, in a typical feed-forward layer containing an affine transformation followed by a non-linearity f (•), a BatchNorm transformation is inserted by applying f (B(Wh)) instead of f (Wh+b), where $$B(x) = \gamma \frac{x - E[x]}{(\text{Var}[x] + \epsilon)^{1/2}} + \beta. \qquad (6)$$

x represents pre-activation, and the terms E and Var are the empirical mean and variance over a minibatch. The bias b of the layer is dropped since its effect is cancelled by mean removal. The learnable parameters γ and β allow the layer to scale and shift each hidden unit as desired. The constant E is small and positive, and is included for numerical stability.

In embodiments, in the convolutional layers, the mean and variance are estimated over all the temporal output units for a given convolutional filter on a minibatch. The BatchNorm transformation reduces internal covariate shift by insulating a given layer from potentially uninteresting changes in the mean and variance of the layer's input.

Two methods of extending BatchNorm to bidirectional RNNs have been explored. In a first method, a BatchNorm transformation is inserted immediately before every non-linearity. Equation 3 then becomes $$\vec{h}_t^l = f(B(W^l h_t^{l-1} + \vec{U}^l \vec{h}_{t-1}^l)) \qquad (7)$$

In this case, the mean and variance statistics are accumulated over a single time-step of a minibatch. The sequential dependence between time-steps prevents averaging over all time-steps. It is found that in embodiments this technique does not lead to improvements in optimization.

In a second method, an average over successive time-steps is accumulated, so later time-steps are normalized over all present and previous time-steps. This also proved ineffective and greatly complicated backpropagation.

FIG. 3 depicts a method of sequence-wise batch normalization, which overcomes these issues of the above-explored methods, according to embodiments of the present invention. In embodiments, the recurrent computation is given by:

$$\vec{h}_t^l = f(B(W^l h_t^{l-1}) + \vec{U}^l \vec{h}_{t-1}^l) \qquad (8)$$

For each hidden unit (which may be applied to both convolution layers and recurrent layers), the mean and variance statistics of the pre-activations in the minibatch over the length of an utterance sequence are computed (305). In embodiments, the batch normalization comprises normalizing pre-activations at each layer of the set of layers to be batch normalized in the RNN.

Figure 4:
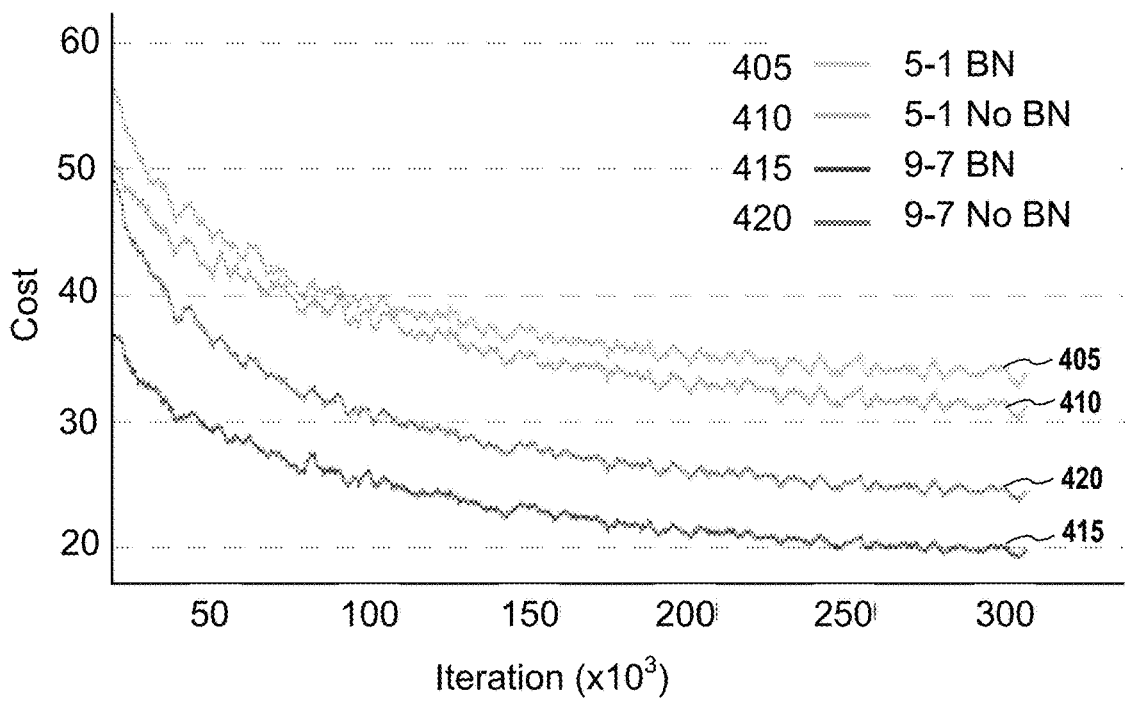
FIG. 4 graphically depicts training curves of two models trained with and without Batch Normalization according to embodiments of the present disclosure.

FIG. 4 shows that deep networks converge faster with sequence-wise normalization according to embodiments of the present disclosure. Table 1 shows that the performance improvement from sequence-wise normalization increases with the depth of the network, with a 12% performance difference for the deepest network. When comparing depth, in order to control for model size, the total number of parameters were held constant and strong performance gains are still seen. Even larger improvements from depth are expected if the number of activations per layer were held constant and layers were added. It is also found that BatchNorm harms generalization error for the shallowest network just as it converges slower for shallower networks.

TABLE 1

Comparison of WER on a training and development set for various depths of RNN, with and without BatchNorm. The number of parameters is kept constant as the depth increases, thus the number of hidden units per layer decreases. All networks have 38 million parameters. The architecture "M RNN, N total" implies 1 layer of 1D convolution at the input, M consecutive bidirectional RNN layers, and the rest as fully-connected layers with N total layers in the network.

| | | Train | | Dev | |
|---|---|---|---|---|---|
| Architecture | Hidden Units | Baseline | BatchNorm | Baseline | BatchNorm |
| 1 RNN, 5 total | 2400 | 10.55 | 11.99 | 13.55 | 14.40 |
| 3 RNN, 5 total | 1880 | 9.55 | 8.29 | 11.61 | 10.56 |
| 5 RNN, 7 total | 1510 | 8.59 | 7.61 | 10.77 | 9.78 |
| 7 RNN, 9 total | 1280 | 8.76 | 7.68 | 10.83 | 9.52 |

Embodiments of the BatchNorm approach works well in training, but may be more difficult to implement for a deployed ASR (automatic speech recognition) system, since it is often necessary to evaluate a single utterance in deployment rather than a batch. Normalizing each neuron to its mean and variance over just the sequence may degrade performance. Thus, in embodiments, a running average of the mean and variance for the neuron collected during training are stored (310), and used for evaluation (315) in deployment. Using this technique, a single utterance can be evaluated at a time with better results than evaluating with a large batch.

3.3 SortaGrad

Training on examples of varying length poses some algorithmic challenges. One possible solution is truncating backpropagation through time, so that all examples have the same sequence length during training. However, this can inhibit the ability to learn longer term dependencies. One approach found that presenting examples in order of difficulty can accelerate online learning. A common theme in many sequence learning problems, including machine translation and speech recognition, is that longer examples tend to be more challenging.

The CTC cost function used implicitly depends on the length of the utterance, $$\mathcal{L}(x, y; \theta) = -\log \sum_{\ell \in Align(x,y)} \prod_t p_{ctc}(\ell_t \mid x; \theta) \quad (9)$$

where Align (x, y) is the set of all possible alignments of the characters of the transcription y to frames of input x under the CTC operator. In equation 9, the inner term is a product over time-steps of the sequence, which shrinks with the length of the sequence since $p_{ctc}(l_t|x;\theta)<1$. This motivates embodiments of curriculum learning strategy which may be referred herein as "SortaGrad". SortaGrad uses the length of the utterance as a heuristic for difficulty, since long utterances have higher cost than short utterances.

FIG. 5 depicts a method of training a RNN model using a curriculum learning strategy according to embodiments of the present invention. For a training set comprising a plurality of minibatches with each minibatch comprising a plurality of utterances, the training set is iterated through (505), in a first training epoch, in an increasing order of the length of the longest utterance in each minibatch. After the first training epoch, training may revert back (510) to a random order over minibatches (e.g., using stochastic training for one or more subsequent epochs).

In embodiments, the abovementioned curriculum learning strategy may be implemented in combination with one or more other strategies for speech recognition.

TABLE 2

Comparison of WER on a training and development set with and without SortaGrad, and with and without batch normalization.

|  | Train | | Dev | |
| --- | --- | --- | --- | --- |
|  | Baseline | BatchNorm | Baseline | BatchNorm |
| Not Sorted | 10.71 | 8.04 | 11.96 | 9.78 |
| Sorted | 8.76 | 7.68 | 10.83 | 9.52 |

Table 2 shows a comparison of training cost with and without SortaGrad on the 9 layer model with 7 recurrent layers. This effect is particularly pronounced for embodiments of networks without BatchNorm, since they are numerically less stable. In some sense the two techniques substitute for one another, though gains are still found when applying SortaGrad and BatchNorm together. Even with BatchNorm it is found that this curriculum improves numerical stability and sensitivity to small changes in training. Numerical instability can arise from different transcendental function implementations in the CPU and the GPU, especially when computing the CTC cost. The SortaGrad curriculum embodiments give comparable results for both implementations.

These benefits, likely occur primarily because long utterances tend to have larger gradients, yet a fixed learning rate independent of utterance length is used in embodiments. Furthermore, longer utterances are more likely to cause the internal state of the RNNs to explode at an early stage in training.

3.4 Comparison of Simple RNNs and GRUs

The models having been shown so far are simple RNNs that have bidirectional recurrent layers with the recurrence for both the forward in-time-and backward-in-time directions modeled by Equation 3. Current research in speech and language processing has shown that having a more complex recurrence may allow the network to remember state over more time-steps while making them more computationally expensive to train. Two commonly used recurrent architectures are the Long Short-Term Memory (LSTM) units and the Gated Recurrent Units (GRU), though many other variations exist. A recent comprehensive study of thousands of variations of LSTM and GRU architectures showed that a GRU is comparable to an LSTM with a properly initialized forget gate bias, and their best variants are competitive with each other. GRUs were examined because experiments on smaller data sets showed the GRU and LSTM reached similar accuracy for the same number of parameters, but the GRUs were faster to train and less likely to diverge.

In embodiments, the GRUs being used are computed by $$z_t = \sigma(W_z x_t + U_z h_{t-1} + b_z)$$

$$r_t = \sigma(W_r x_t + U_r h_{t-1} + b_r)$$

$$\tilde{h}_t = f(W_h x_t + r_t \circ U_h h_{t-1} + b_h)$$

$$h_t = (1-z_t) h_{t-1} + z_t \tilde{h}_t \quad (10)$$

where $\sigma(\cdot)$ is the sigmoid function, z and r represent the update and reset gates respectively, and the layer superscripts are dropped for simplicity. Embodiments of this GRU differ from a standard GRU in that the hidden state $h_{t-1}$ is multiplied by $U_h$ prior to scaling by the reset gate. This allows for all operations on $h_{t-1}$ to be computed in a single matrix multiplication. The output nonlinearity $f(\cdot)$ is typically the hyperbolic tangent function tanh. However, in embodiments, similar performance is found for tanh and clipped-ReLU nonlinearities. In embodiments, the clipped-ReLU is chosen to use for simplicity and uniformity with the rest of the network.

Table 3 shows comparison of development set WER for networks with either simple RNN or GRU, for various depths. All models have batch normalization, one layer of 1D-invariant convolution, and approximately 38 million parameters.

TABLE 3

Comparison of development set WER for networks with simple RNN or GRU

| Architecture | Simple RNN | GRU |
| --- | --- | --- |
| 5 layers, 1 Recurrent | 14.40 | 10.53 |
| 5 layers, 3 Recurrent | 10.56 | 8.00 |
| 7 layers, 5 Recurrent | 9.78 | 7.79 |
| 9 layers, 7 Recurrent | 9.52 | 8.19 |

Both GRU and simple RNN architectures benefit from batch normalization and show strong results with deep networks. However, Table 3 shows that for a fixed number of parameters, the GRU architectures achieve better WER for all network depths. This is clear evidence of the long-term dependencies inherent in the speech recognition task present both within individual words and between words. As discussed in Section 3.8, even simple RNN embodiments are able to implicitly learn a language model due to the large amount of training data. Interestingly, the GRU network embodiments with 5 or more recurrent layers do not significantly improve performance. This is attributed to the thinning from 1728 hidden units per layer for 1 recurrent layer to 768 hidden units per layer for 7 recurrent layers, to keep the total number of parameters constant.

The GRU network embodiments outperformed the simple RNN embodiments in Table 3. However, in later results (Section 6), it is found that as the model size is scaled up, for a fixed computational budget the simple RNN networks perform slightly better. Given this, most of the remaining experiments use the simple RNN layer embodiments rather than the GRU layer embodiments.

3.5 Frequency Convolutions

Temporal convolution is commonly used in speech recognition to efficiently model temporal translation invariance for variable length utterances. This type of convolution was first proposed for neural networks in speech more than 25 years ago. Many neural network speech models have a first layer that processes input frames with some context window. This may be viewed as a temporal convolution with a stride of one.

Additionally, sub-sampling helps make recurrent neural networks computationally tractable with high sample-rate audio. A prior deep speech system accomplished this through the use of a spectrogram as input and temporal convolution in the first layer with a stride parameter to reduce the number of time-steps, as described in U.S. patent application Ser. No. 14/735,002, filed on 9 Jun. 2015, entitled "SYSTEMS AND METHODS FOR SPEECH TRANSCRIPTION," which is incorporated by reference herein in its entirety. Embodiments in the aforementioned patent document may be referred to herein as Deep Speech 1 or DS1.

Convolutions in frequency and time domains, when applied to the spectral input features prior to any other processing, can slightly improve ASR performance. Convolution in frequency attempts to model spectral variance due to speaker variability more concisely than what is possible with large fully connected networks. In embodiments, since spectral ordering of features is removed by fully-connected and recurrent layers, frequency convolutions work better as the first layers of the network.

Embodiments with between one and three layers of convolution were explored. These convolution layers may be in the time-and-frequency domain (2D invariance) and in the time-only domain (1D invariance). In all cases, a same convolution was used, preserving the number of input features in both frequency and time. In some embodiments, a stride across either dimension was specified to reduce the size of the output. In embodiments the number of parameters was not explicitly controlled, since convolutional layers add a small fraction of parameters to the networks. All networks shown in Table 4 have about 35 million parameters.

TABLE 4

Comparison of WER for various arrangements of convolutional layers. In all cases, the convolutions are followed by 7 recurrent layers and 1 fully connected layer. For 2D-invariant convolutions the first dimension is frequency and the second dimension is time. All models have BatchNorm, SortaGrad, and 35 million parameters.

| Architecture | Channels | Filter dimension | Stride | Regular Dev | Noisy Dev |
| --- | --- | --- | --- | --- | --- |
| 1-layer 1D | 1280 | 11 | 2 | 9.52 | 19.36 |
| 2-layer 1D | 640, 640 | 5, 5 | 1, 2 | 9.67 | 19.21 |
| 3-layer 1D | 512, 512, 512 | 5, 5, 5 | 1, 1, 2 | 9.20 | 20.22 |
| 1-layer 2D | 32 | 41 × 11 | 2 × 2 | 8.94 | 16.22 |
| 2-layer 2D | 32, 32 | 41 × 11, 21 × 11 | 2 × 2, 2 × 1 | 9.06 | 15.71 |
| 3-layer 2D | 32, 32, 96 | 41 × 11, 21 × 11, 21 × 11 | 2 × 2, 2 × 1, 2 × 1 | 8.61 | 14.74 |

Results of the various embodiments are reported on two datasets—a development set of 2048 utterances ("Regular Dev") and a much noisier dataset of 2048 utterances ("Noisy Dev") randomly sampled from the CHiME 2015 development datasets. It was found that multiple layers of 1D-invariant convolutions provide a very small benefit. Embodiments with 2D-invariant convolutions improve results substantially on noisy data, while providing a small benefit on clean data. The change from one layer of 1D-invariant convolution to three layers of 2D-invariant convolution improves WER by 23.9% on the noisy development set.

3.6 Striding

In embodiments, in the convolutional layers, a longer stride and wider context are applied to speed up training as fewer time-steps are required to model a given utterance. Downsampling the input sound (through Fast Fourier Transforms and convolutional striding) reduces the number of time-steps and computation required in the following layers, but at the expense of reduced performance.

FIG. 6 depicts a method for striding data according to embodiments of the present invention. As shown in FIG. 6, in step 605 processing time may be shorten for the recurrent layers by taking strides of a step size of q time slices (e.g., step size of 2) in the original input so that the unrolled RNN has fewer steps.

In the Mandarin model embodiments, striding is employed in a straightforward way. However, in the English model embodiments, striding may reduce accuracy simply because the output of the network requires at least one time-step per output character, and the number of characters in English speech per time-step is high enough to cause problems when striding. It should be noted that Chinese characters are more similar to English syllables than English characters. This is reflected in the training data, where there are on average 14.1 characters/s in English, while only 3.3 characters/s in Mandarin. Conversely, the Shannon entropy per character as calculated from occurrence in the training set, is less in English due to the smaller character set—4.9 bits/char compared to 12.6 bits/char in Mandarin. This implies that spoken Mandarin has a lower temporal entropy density, ~41 bits/s compared to ~58 bits/s, and can thus more easily be temporally compressed without losing character information. To overcome this, the English alphabet may be enriched in step 610 with symbols representing alternate labellings, such as whole words, syllables, or non-overlapping n-grams. In embodiments, non-overlapping bi-graphemes or bigrams are used, since these are simple to construct, unlike syllables, and there are few of them compared to alternatives such as whole words. In embodiments, unigram labels are transformed into bigram labels through a simple isomorphism.

Non-overlapping bigrams shorten the length of the output transcription and thus allow for a decrease in the length of the unrolled RNN. In embodiments, an isomorphism may be, for example, as follows—the sentence "the cat sat" with non-overlapping bigrams is segmented as [th, e, space, ca, t, space, sa, t]. Notice that, in embodiments, for words with odd number of characters, the last character becomes a unigram and space is treated as a unigram as well. This isomorphism ensures that the same words are always composed of the same bigram and unigram tokens. The output set of bigrams consists of all bigrams that occur in the training set.

Table 5 shows results for embodiments of both bigram and unigram systems for various levels of striding, with or without a language model. It is observed that bigrams allow for larger strides without any sacrifice in the word error rate. This allows embodiments with reduced number of time-steps of the unrolled RNN, benefiting both computation and memory usage.

TABLE 5

Comparison of World Error Rate (WER) with different amounts of striding for unigram and bigram outputs on a model with 1 layer of 1D-invariant convolution, 7 recurrent layers, and 1 fully connected layer. All models have BatchNorm, SortaGrad, and 35 million parameters. The models are compared on a development set with and without the use of a 5-gram language model:

| Stride | Dev no LM | | Dev LM | |
| --- | --- | --- | --- | --- |
| | Unigrams | Bigrams | Unigrams | Bigrams |
| 2 | 14.93 | 14.56 | 9.52 | 9.66 |
| 3 | 15.01 | 15.60 | 9.65 | 10.06 |
| 4 | 18.86 | 14.84 | 11.92 | 9.93 |

3.7 Row Convolution and Unidirectional Models Frequency

Bidirectional RNN models are challenging to deploy in an online, low-latency setting, because they are built to operate on an entire sample, and so it is not possible to perform the transcription process as the utterance streams from the user. Presented herein are embodiments of a unidirectional architecture that perform as well as bidirectional models. This allows unidirectional, forward-only RNN layers to be used in a deployment system embodiment.

Figure 7:
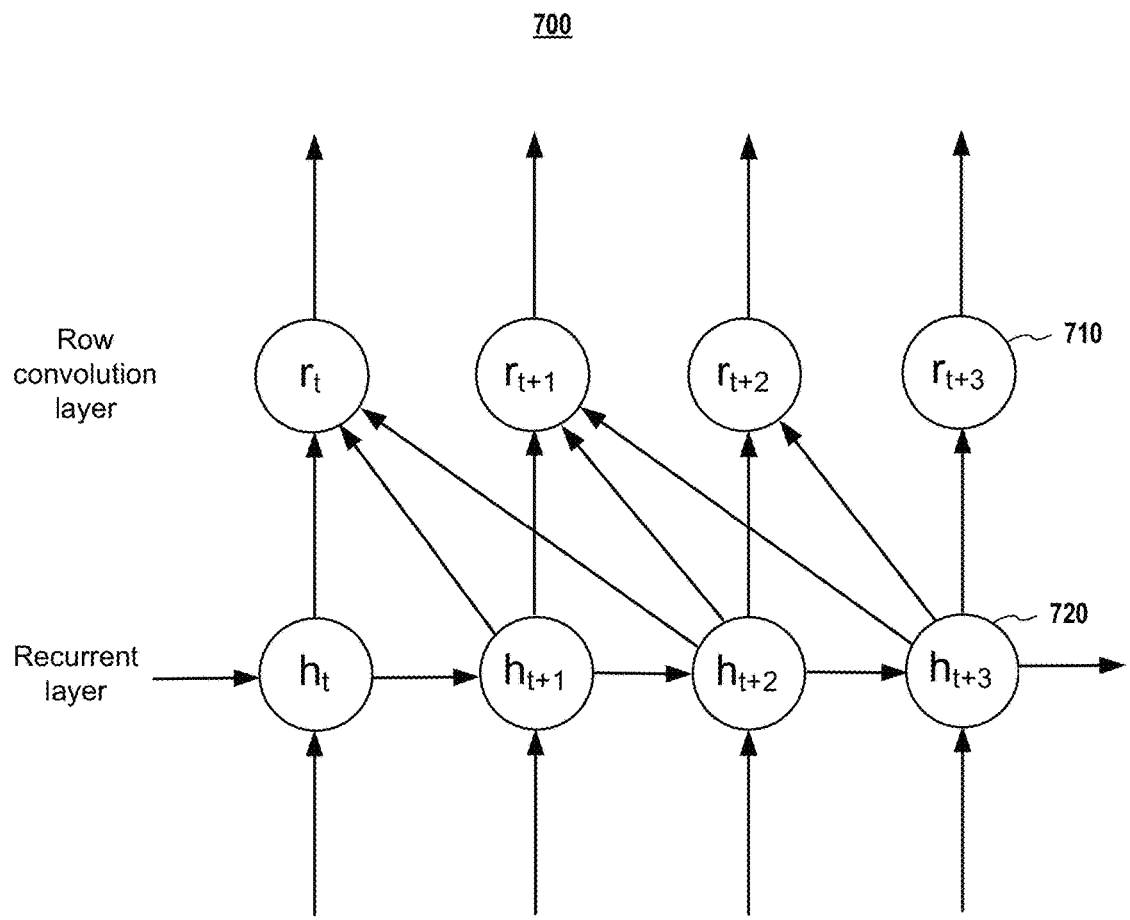
FIG. 7 depicts a row convolution architecture with future context size of 2 according to embodiments of the present disclosure.

To accomplish this, in embodiments, a special layer (row convolution) is employed, as shown in FIG. 7, which depicts a row convolution architecture with future context size of 2 according to embodiments of the present disclosure. In FIG. 7, the row convolution layer 710 is placed above all recurrent layers (e.g., 720). The intuition behind this layer is that a small portion of future information is only needed to make an accurate prediction at the current time-step. Suppose at time-step t, future contexts of $\tau$ steps are used. This yields a feature matrix $h_{t:t+\tau}=[h_t, h_{t+1}, \ldots, h_{t+\tau}]$ of size $d \times (\tau+1)$. A parameter matrix W of the same size as $h_{t:t+\tau}$ is defined. The activations $r_t$ for the new layer at time-step t are $$r_{t,i} = \sum_{j=1}^{\tau+1} W_{i,j} h_{t+j-1,i}, \text{ for } 1 \leq i \leq d \qquad (11)$$

where i represents an index of neuron in the current layer and d represents the number of neurons in the current layer. Since the convolution-like operation in Eq. 11 is row oriented for both W and $h_{t:t+\tau}$, this layer is called row convolution.

FIG. 8 depicts a method for audio transcription with a unidirectional RNN model according to embodiments of the present invention. In step 805, a row convolution layer is placed above all recurrent layers of the RNN model. This has two advantages. First, this allows streaming of all computation below the row convolution layer on a finer granularity given little future context is needed. Second, this results in better Character Error Rate compared to the best bidirectional model for Mandarin. In step 810, an activation of the row convolution layer is obtained using information of the recurrent layers at current time step and at least one future time step. It appears that the recurrent layers have learned good feature representations, so the row convolution layer simply gathers the appropriate information to feed to the classifier in step 815. Results for a unidirectional Mandarin speech system embodiment with row convolution and a comparison to a bidirectional model are given in Section 7 on deployment.

3.8 Language Model

Embodiments of the RNN models are trained over millions of unique utterances, which enable the network to learn a powerful implicit language model. Some of the best models are quite adept at spelling, without any external language constraints. Further, in the development datasets, many cases are found where embodiments could implicitly disambiguate homophones—for example, "he expects the Japanese agent to sell it for two hundred seventy-five thousand dollars". Nevertheless, the labeled training data is small compared to the size of unlabeled text corpora that are available. Thus, it was found that WER improves when embodiments of the system are supplemented with a language model trained from external text.

Figure 9:
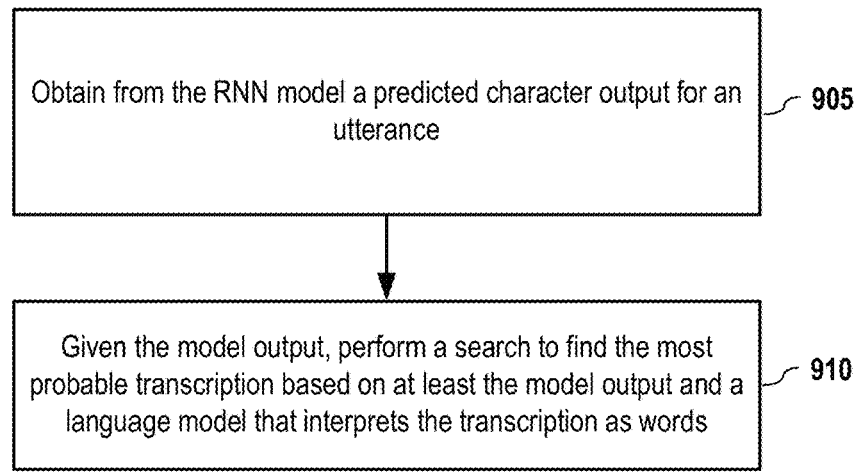
FIG. 9 depicts a method for training a speech transcription model adaptive to multiple languages according to embodiments of the present disclosure.

FIG. 9 depicts a method for constraining output of model using a language model according to embodiments of the present invention.

In step 905, predicted character(s) output for an utterance, x, is obtained from the RNN model.

In step 910, given the output of the RNN model or models, a search is performed to find the transcription y that is most probable according to both the RNN output and a language model which interprets the transcription as words.

In embodiments, the language model is an external language model. The external language model may be an n-gram language model since they scale well to large amounts of unlabeled text. For English, in embodiments the language model is a Kneser-Ney smoothed 5-gram model with pruning that is trained using the KenLM toolkit on cleaned text from the Common Crawl Repository. The vocabulary is the most frequently used 400,000 words from 250 million lines of text, which produces a language model with about 850 million n-grams. For Mandarin, the language model is a Kneser-Ney smoothed character level 5-gram model with pruning that is trained on an internal text corpus of 8 billion lines of text. This produces a language model with about 2 billion n-grams. A character level language model may be needed in Mandarin as words are not usually segmented in text, as shown in details in section 3.9.

In embodiments, the search for transcription y is to maximize Q(y) shown in Equation 12, which is a linear combination of logarithm probabilities from the CTC trained network and language model, along with a word insertion term:

$$Q(y)=\log(p_{ctc}(y|x))+\alpha\log(p_{lm}(y))+\beta\text{word\_count}(y) \quad (12)$$

The weight $\alpha$ controls the relative contributions of the language model and the CTC network. The weight $\beta$ encourages more words in the transcription. These parameters are tuned on a development set. In embodiments, a beam search is used to find the optimal transcription.

Table 6 shows that an external language model helps both English and Mandarin speech systems. The relative improvement given by the language model drops from 48% to 36% in English and 27% to 23% in Mandarin, from a model with 5 layers and 1 recurrent layer to a model with 9 layers and 7 recurrent layers. It is hypothesized that the network builds a stronger implicit language model with more recurrent layers.

TABLE 6

Comparison of WER for English and CER for Mandarin with and without a language model. These are simple RNN models with only one layer of 1D invariant convolution.

| Language | Architecture | Dev no LM | Dev LM |
|---|---|---|---|
| English | 5-layer, 1 RNN | 27.79 | 14.39 |
| English | 9-layer, 7 RNN | 14.93 | 9.52 |
| Mandarin | 5-layer, 1 RNN | 9.80 | 7.13 |
| Mandarin | 9-layer, 7 RNN | 7.55 | 5.81 |

The relative performance improvement from a language model is higher in English than in Mandarin. This is attributed to the fact that a Chinese character represents a larger block of information than an English character. For example, if syllables or words in English are output directly, the model would make fewer spelling mistakes and the language model would likely helpless.

3.9 Adaption to Mandarin

The techniques described herein can be used to build an end-to-end Mandarin speech recognition system that outputs Chinese characters directly. This precludes the need to construct a pronunciation model, which is often a fairly involved component for porting speech systems to other languages. Direct output to characters also precludes the need to explicitly model-language specific pronunciation features. For example, Mandarin tones do not need to be modeled explicitly, as some speech systems must do.

In embodiments, the only architectural changes made to the networks are due to the characteristics of the Chinese character set. In embodiments, the output layer of the network outputs about 6000 characters, which includes the Roman alphabet, since hybrid Chinese-English transcripts are common. In embodiments, the system may indicate an out-of-vocabulary error at evaluation time if a character is not contained in this set. This is not a major concern, as the test set has only 0.74% out of vocab characters. In embodiments, a character that produces and out-of-vocabulary error may be added to the vocabulary and re-training may be done to the model.

In embodiments, a character-level language model is used in Mandarin as words are not usually segmented in text. The word insertion term of Equation 12 becomes a character insertion term. In addition, it is found that the performance of the beam search during decoding levels off at a smaller beam size. Thus, in embodiments, a beam size of 200 may be used with a negligible degradation in CER. In Section 6.2, it is shown that embodiments of the Mandarin speech models show roughly the same improvements to architectural changes as embodiments of the English speech models.

4. System Optimizations

Embodiments of the networks have tens of millions of parameters, and embodiments of the training algorithm take tens of single-precision exaFLOPs to converge. Since the ability to evaluate hypotheses about data and models depends on the ability to train models quickly, a highly optimized training system was built. Embodiments of this system have two main components—a deep learning library (written in C++), along with a high-performance linear algebra library (written in both CUDA and C++). The optimized software, running on dense compute nodes with 8 Titan X GPUs per node, allows sustaining 24 single-precision teraFLOP/second when training a single model on one node. This is 45% of the theoretical peak computational throughput of each node. Multiple nodes can also be scaled to, as outlined in the next subsection.

4.1 Scalability and Data-Parallelism

A standard technique of data-parallelism was used to train on multiple GPUs using synchronous Stochastic Gradient Descent (SGD). A common configuration used a minibatch of 512 on 8 GPUs. Embodiments of a training pipeline used herein binds one process to each GPU. These processes then exchange gradient matrices during the back-propagation by using all-reduce, which exchanges a matrix between multiple processes and sums the result so that at the end, each process has a copy of the sum of all matrices from all processes.

Synchronous SGD was found useful because it is reproducible and deterministic. It has been found that the appearance of non-determinism in a system often signals a serious bug, and so having reproducibility as a goal has greatly facilitated debugging. In contrast, asynchronous methods such as asynchronous SGD with certain parameter servers typically do not provide reproducibility and are therefore more difficult to debug. Synchronous SGD is simple to understand and implement. It scales well as multiple nodes are added to the training process.

Figure 10:
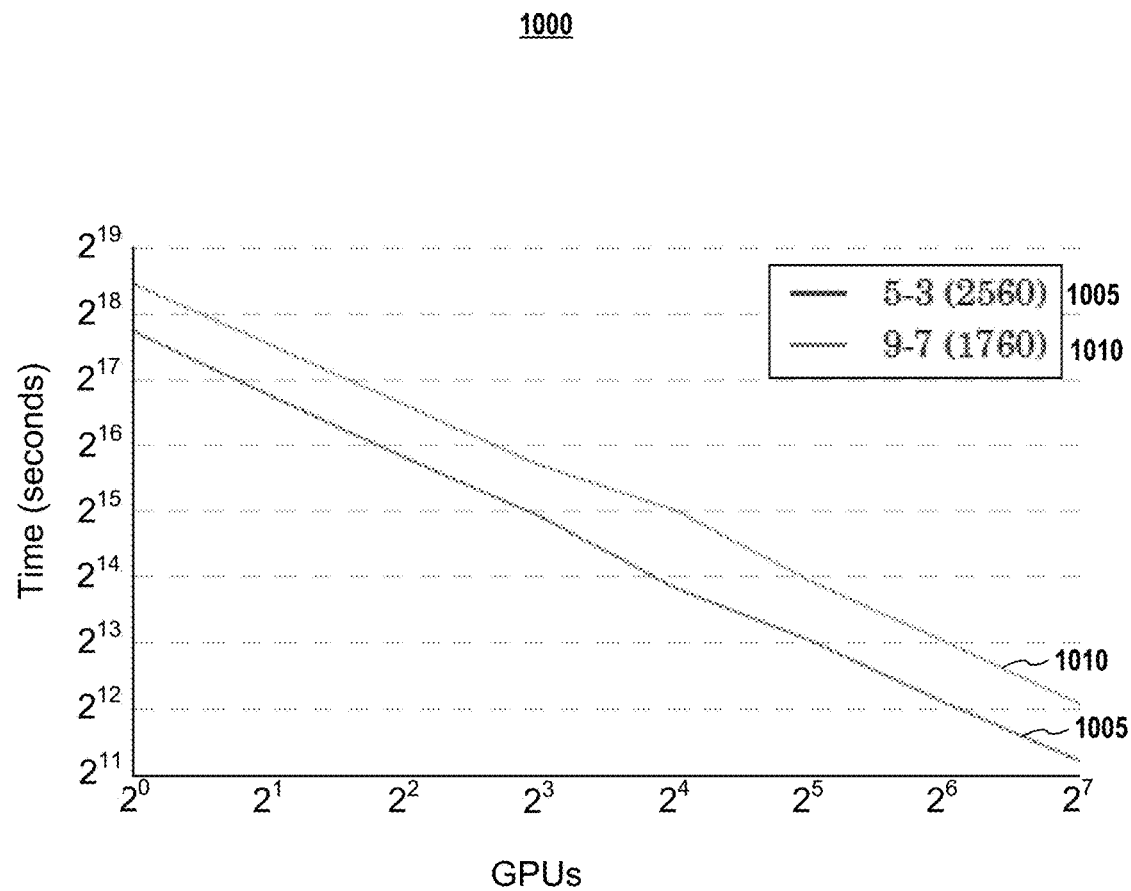
FIG. 10 depicts a scaling comparison of two networks according to embodiments of the present disclosure.

FIG. 10 shows scaling comparison of two networks—a 5 layer model (1005) with 3 recurrent layers containing 2560 hidden units in each layer and a 9 layer model (1010) with 7 recurrent layers containing 1760 hidden units in each layer. The times shown are to train 1 epoch. The 5 layer model trains faster because it uses larger matrices and is more computationally efficient.

According to FIG. 10, the time taken to train one epoch halves as the number of GPUs being trained on are doubled, thus achieving near-linear weak scaling. The minibatch per GPU is kept constant at 64 during this experiment, effectively doubling the minibatch as the number of GPUs is doubled. Although the ability to scale to large minibatches is there, either 8 or 16 GPUs were typically used during training with a minibatch of 512 or 1024, in order to converge to the best result.

In embodiments, a ring algorithm was implemented for higher performance and better stability, since all-reduce is important to the scalability of training. This implementation avoids extraneous copies between CPU and GPU, and is fundamental to scalability. In embodiments, OpenMPI is configured with the smcuda transport that can send and receive buffers residing in the memory of two different GPUs by using GPUDirect. When two GPUs are in the same PCI root complex, any unnecessary copies to CPU memory are avoided. This also takes advantage of tree-structured interconnects by running multiple segments of the ring concurrently between neighboring devices. In embodiments, this implementation is built using MPI send and receive, along with CUDA kernels for the element-wise operations.

Table 7 compares the performance of the all-reduce implementation with that provided by OpenMPI version 1.8.5. The time spent in all-reduce for a full training run that ran for one epoch on an English dataset using a 5 layer, 3 recurrent layer architecture with 2560 hidden units for all layers is reported. In this table, a minibatch of 64 per GPU is used, expanding the algorithmic minibatch when scaled to more GPUs. It is seen that this implementation is considerably faster than OpenMPI's when the communication is within a node (8 GPUs or less). As the number of GPUs and the amount of inter-node communication are increased, the gap shrinks, although the implementation is still 2-4× faster.

TABLE 7

Comparison of two different all-reduce implementations. All times are in seconds. Performance gain is the ratio of OpenMPI all-reduce time to all-reduce time.

| GPU | OpenMPI all-reduce | Embodiment of Our all-reduce | Performance Gain |
| --- | --- | --- | --- |
| 4 | 55359.1 | 2587.4 | 21.4 |
| 8 | 48881.6 | 2470.9 | 19.8 |
| 16 | 21562.6 | 1393.7 | 15.5 |
| 32 | 8191.8 | 1339.6 | 6.1 |
| 64 | 1395.2 | 611.0 | 2.3 |
| 128 | 1602.1 | 422.6 | 3.8 |

All of the training runs used either 8 or 16 GPUs, and in this regime, the all-reduce implementation embodiment resulted in 2.5× faster training for the full training run, compared to using OpenMPI directly. Optimizing all-reduce has thus resulted in important productivity benefits for experiments, and has made embodiments of the simple synchronous SGD approach scalable.

4.2 GPU Implementation of CTC Loss Function

Calculating the CTC loss function is more complicated than performing forward and back propagation on RNN architectures. Originally, activations from the GPUs are transferred to the CPU, where the loss function is calculated using an OpenMP parallelized implementation of CTC. However, this implementation limited scalability rather significantly, for two reasons. Firstly, it became computationally more significant as efficiency and scalability of the RNN itself are improved. Secondly, transferring large activation matrices between CPU and GPU required spending interconnect bandwidth for CTC, rather than on transferring gradient matrices to allow scaling using data parallelism to more processors.

To overcome this, a GPU implementation of the CTC loss function was created. The parallel implementation relies on a slight refactoring to simplify the dependences in the CTC calculation, as well as the use of optimized parallel sort implementations from Modern GPU. More details of this parallelization are given below.

The CTC loss function used to train the models has two passes: forward and backward, and the gradient computation involves element-wise addition of two matrices, $\alpha$ and $\beta$, generated during the forward and backward passes respectively. Finally, the gradients are summed using the character in the utterance label as the key, to generate one gradient per character. These gradients are then back-propagated through the network. The inputs to the CTC loss function are probabilities calculated by the softmax function which can be very small, so it is computed in log probability space for better numerical stability.

The forward pass of the CTC algorithm calculates the $\alpha$ matrix, which has S rows and T columns, where $S=2(L+1)$. The variable L is the number of characters in the label and T is the number of time-steps in the utterance. A CPU-based implementation of the CTC algorithm assigns one thread to each utterance label in a minibatch, performing the CTC calculation for the utterances in parallel. Each thread calculates the relevant entries of the matrix sequentially. This is inefficient for two reasons.

Firstly, since the remainder of the network is computed on the GPU, in embodiments, the output of the softmax function is copied to the CPU for CTC calculation. In embodiments, the gradient matrices from the CTC function then is copied back to the GPU for backpropagation. For languages like Mandarin with large character sets, these matrices have hundreds of millions of entries, making this copy expensive. Furthermore, as much interconnect bandwidth is needed as possible for synchronizing the gradient updates with data parallelism, so this copy incurs a substantial opportunity cost.

Secondly, although entries in each column of the $\alpha$ matrix can be computed in parallel, the number of entries to calculate in each column depends both on the column and the number of repeated characters in the utterance label. Due to this complexity, the CPU implementation does not use SIMD parallelism optimally, making the computation inefficient.

Figure 11:
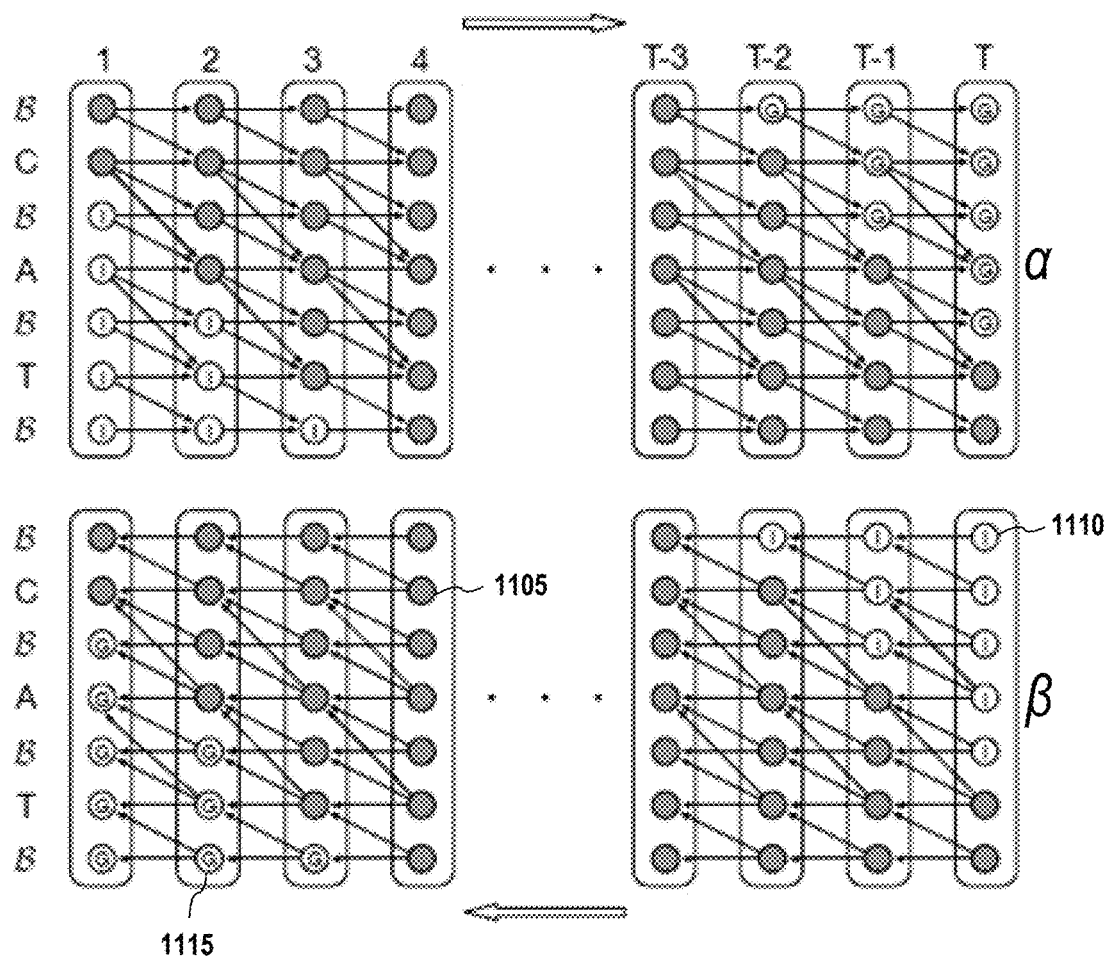
FIG. 11 depicts forward and backward pass for GPU implementation of Connectionist Temporal Classification (CTC) according to embodiments of the present disclosure.

On the contrary, a GPU-based implementation of CTC can be done to overcome these two problems. FIG. 11 depicts forward and backward pass for GPU implementation of CTC. Gray circles 1105 contain valid values, circle 1110 with I contain $-\infty$ and circle 1115 with G contain garbage values that are finite. B stands for the blank character that the CTC algorithm adds to the input utterance label. Column labels on top show different time-steps going from 1 to T.

A key insight behind the implementation is that all elements, rather than just the valid entries, in each column of the $\alpha$ matrix can be computed. Invalid elements in FIG. 11 either contain a finite garbage value (G), or $-\infty$ (I), when a special summation function is used that adds probabilities in log space that discards inputs of $-\infty$. This summation is shown in FIG. 11 where arrows incident on a circle are inputs and the result is stored in the circle. However, when the final gradient is computed by element-wise summing $\alpha$ and $\beta$, all finite garbage values will be added with a corresponding $-\infty$ value from the other matrix, which results in $-\infty$, effectively ignoring the garbage value and computing the correct result. One important observation is that this element-wise sum of $\alpha$ and $\beta$ is a simple sum and does not use summation function.

FIG. 12 depicts a method of GPU implementation of the CTC loss function for RNN model training according to embodiments of the present invention.

In step 1205, the RNN model outputs a probability distribution over predicted characters corresponding to input utterances to a Connectionist Temporal Classification (CTC) layer.

In step 1210, a graphics processing unit (GPU) based CTC loss function algorithm is implemented. The CTC loss function has a forward pass and a backward pass. The gradient computation involves element-wise addition of two matrices, α(forward matrix) and β (backward matrix), generated during the forward and backward passes respectively. The algorithm comprising parallel computation to process of the two matrices.

In embodiments, the parallel computation comprises one or more of the following approaches:

(a) taking (1215) each column of the matrix generated from element-wise addition of α and β matrices using the ModernGPU library and doing a key-value reduction using the character as key, in order to compute the gradient. This means elements of the column corresponding to the same character will sum up their values. In the example shown in FIG. 11 the blank character, B, is the only repeated character and at some columns, say for t=1 of t=2, both valid elements (gray) and −∞ correspond to it. Since the summation function in log space effectively ignores the −∞ elements, only the valid elements are combined in the reduction.

In embodiments, each utterance in a minibatch is mapped to a compute thread block (such as CUDA thread block). Since there are no dependencies between the elements of a column, all of them can be computed in parallel by the threads in a thread block. There are dependencies between columns, since the column corresponding to time-step t+1 cannot be computed before the column corresponding to time-step t. The reverse happens when computing the β matrix, when column corresponding to time-step t cannot be computed before the column corresponding to time-step t+1. Thus, in both cases, columns are processed sequentially by the thread block.

(b) mapping (1220) the forward and backward passes to corresponding compute kernels. In embodiments, the compute kernels are GPU executed compute kernels, such as CUDA kernels. This is straightforward since there are no data dependencies between elements of a column. The kernel that does the backward pass also computes the gradient. However, since the gradients must be summed up based on the label values, with each character as key, data dependencies must be dealt with due to repeated characters in an utterance label. For languages with small character sets like English, this happens with high probability. Even if there are no repeated characters, the CTC algorithm adds L+1 blank characters to the utterance label.

In embodiments, fast shared memory and registers are used to achieve high performance when performing this task. Both forward and backward kernels store the a matrix in shared memory. Since shared memory is a limited resource, it is not possible to store the entire β matrix. However, as going backward in time, only one column of the β matrix is needed to be kept as the gradient is computed, adding element-wise the column of the β matrix with the corresponding column of the α matrix. Due to on-chip memory space constraints, the output of the softmax function is read directly from off-chip global memory.

(c) performing (1225) a key-value sort, where the keys are the characters in the utterance label, and the values are the indices of each character in the utterance. After sorting, all occurrences of a given character are arranged in contiguous segments. Each utterance is only needed to be sorted once. The indices generated by the sort are then used to sequentially sum up the gradients for each character. This sum is done once per column and in parallel over all characters in the utterance. Amortizing the cost of key-value sort over T columns is a key insight that makes the gradient calculation fast.

Due to inaccuracies in floating-point arithmetic, especially in transcendental functions, GPU and CPU implementation are not bit-wise identical. This is not an impediment in practice, since both implementations train models equally well when coupled with the technique of sorting utterances by length mentioned in Section 3.3.

Table 8 compares the performance of two CTC implementations. The GPU implementation saves 95 minutes per epoch in English, and 25 minutes in Mandarin. This reduces overall training time by 10-20%, which is also an important productivity benefit for experiments.

TABLE 8

Comparison of time spent in seconds in computing the CTC loss function and gradient in one epoch for two different implementations. Speedup is the ratio of CPU CTC time to GPU CTC time.

| Language | Architecture | CPU CTC Time | GPU CTC Time | Speedup |
|---|---|---|---|---|
| English | 5-layer, 3 RNN | 5888.12 | 203.56 | 28.9 |
| Mandarin | 5-layer, 3 RNN | 1688.01 | 135.05 | 12.5 |

4.3 Memory Allocation

Embodiments of the system makes frequent use of dynamic memory allocations to GPU and CPU memory, mainly to store activation data for variable length utterances, and for intermediate results. Individual allocations can be very large; over 1 GB for the longest utterances. For these very large allocations, it is found that CUDA's memory allocator and even std::malloc introduced significant overhead into application—over a 2× slowdown from using std::malloc in some cases. This is because both cudaMalloc and std::malloc forward very large allocations to the operating system or GPU driver to update the system page tables. This is a good optimization for systems running multiple applications, all sharing memory resources, but editing page tables is pure overhead for certain system embodiments, where nodes are dedicated entirely to running a single model. To get around this limitation, a specific memory allocator was written for both CPU and GPU allocations. This implementation follows the approach of the last level shared allocator in jemalloc: all allocations are carved out of contiguous memory blocks using the buddy algorithm. To avoid fragmentation, all of GPU memory is pre-allocated at the start of training and subdivide individual allocations from this block. Similarly, the CPU memory block size forwarded to mmap is set to be substantially larger than std::malloc, at 12 GB.

Most of the memory required for training deep recurrent networks is used to store activations through each layer for use by back propagation, not to store the parameters of the network. For example, storing the weights for a 70M parameter network with 9 layers requires approximately 280 MB of memory, but storing the activations for a batch of 64, seven-second utterances requires 1.5 GB of memory. TitanX GPUs include 12 GB of GDDR5 RAM, and sometimes very deep networks can exceed the GPU memory capacity when processing long utterances. This can happen unpredictably, especially when the distribution of utterance lengths includes outliers, and it is desirable to avoid a catastrophic failure when this occurs. When a requested memory allocation exceeds available GPU memory, page-locked GPU-memory-mapped CPU memory is allocated using cudaMallocHost instead. This memory can be accessed directly by the GPU by forwarding individual memory trans-actions over PCIe at reduced bandwidth, and it allows a model to continue to make progress even after encountering an outlier.

The combination of fast memory allocation with a fallback mechanism that allows slightly overflowing available GPU memory in exceptional cases makes embodiments of the system significantly simpler, more robust, and more efficient.

5. Training Data

Large-scale deep learning systems require an abundance of labeled training data. An extensive training dataset has been collected for both English and Mandarin speech models, in addition to augmenting training with publicly available datasets. In English, 11,940 hours of labeled speech data containing 8 million utterances, summarized in Table 9, were used. For the Mandarin system, 9,400 hours of labeled audio containing 11 million utterances were used. The Mandarin speech data comprises internal Baidu corpora, representing a mix of read speech and spontaneous speech, in both standard Mandarin and accented Mandarin.

TABLE 9

Summary of the datasets used to train embodiments of DS2 in English. The Wall Street Journal (WSJ), Switchboard and Fisher corpora are all published by the Linguistic Data Consortium. The LibriSpeech dataset is available free on-line. The other datasets are internal Baidu corpora.

| Dataset | Speech Type | Hours |
| --- | --- | --- |
| WSJ | read | 80 |
| Switchboard | conversational | 300 |
| Fisher | conversational | 2000 |
| LibriSpeech | read | 960 |
| Baidu | read | 5000 |
| Baidu | mixed | 3600 |
| Total | | 11940 |

5.1 Dataset Construction

Figure 13:
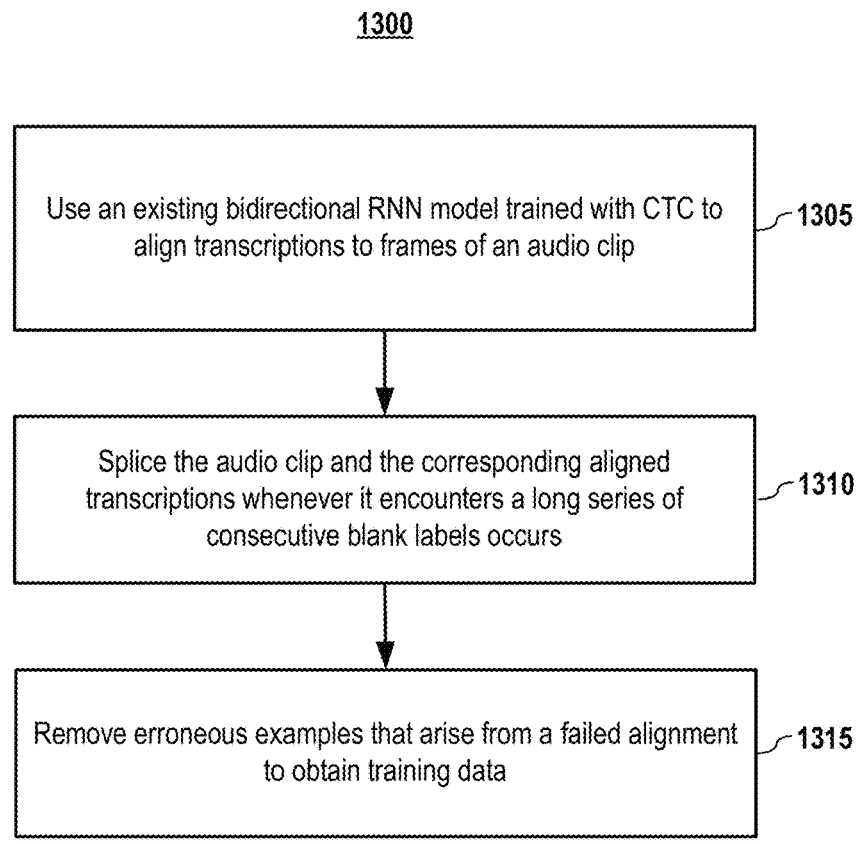
FIG. 13 depicts a method of data acquisition for speech transcription training according to embodiments of the present disclosure.

Some of the internal English (3,600 hours) and Mandarin (1,400 hours) datasets were created from raw data captured as long audio clips with noisy transcriptions. The length of these clips ranged from several minutes to more than hour, making it impractical to unroll them in time in the RNN during training. To solve this problem, an alignment, segmentation, and filtering pipeline was developed that can generate a training set with shorter utterances and few erroneous transcriptions. FIG. 13 depicts a method of data acquisition for speech transcription training according to embodiments of the present disclosure.

The first step 1305 in the pipeline is to use an existing bidirectional RNN model trained with CTC to align the transcription to the frames of audio. For a given audio-transcript pair, (x, y), the alignment maximizes $$\ell^* = \underset{\ell \in \text{Align}(x,y)}{\text{argmax}} \prod_{t}^{T} p_{ctc}(\ell_t \mid x; \theta) \quad (13)$$

This is essentially a Viterbi alignment found using a RNN model trained with CTC. Since Equation 9 integrates over the alignment, the CTC loss function is never explicitly asked to produce an accurate alignment. In principle, CTC could choose to emit all the characters of the transcription after some fixed delay, and this can happen with unidirectional RNNs. However, it is found that CTC produces an accurate alignment when trained with a bidirectional RNN.

In embodiments, following the alignment is a segmentation step 1310 that splices the audio and the corresponding aligned transcription whenever it encounters a long series of consecutive blank labels, since this usually denotes a stretch of silence. By tuning the number of consecutive blanks, the length of the utterances generated can be tuned. In embodiments, for the English speech data, a space token is required to be within the stretch of blanks in order to segment on word boundaries. The segmentation is tuned to generate utterances that are on average 7 seconds long.

In embodiments, the next step 1315 in the pipeline removes erroneous examples that arise from a failed alignment to obtain training data. In embodiments, the ground truth transcriptions for several thousand examples are crowd sourced. In embodiments, the word level edit distance between the ground truth and the aligned transcription is used to produce a good or bad label. In embodiments, a threshold for the word level edit distance is chosen such that the resulting WER of the good portion of the development set is less than 5%. In embodiments, a linear classifier is trained to accurately predict bad examples given the input features generated from the speech recognizer.

In embodiments, the following features are found to be useful: the raw CTC cost, the CTC cost normalized by the sequence length, the CTC cost normalized by the transcript length, the ratio of the sequence length to the transcript length, the number of words in the transcription and the number of characters in the transcription. For the English dataset, it is found that the filtering pipeline reduces the WER from 17% to 5% while retaining more than 50% of the examples.

5.2 Data Augmentation

In embodiments, the training data may be augmented by adding noise to increase the effective size of the training data and to improve its robustness to noisy speech. Although the training data contains some intrinsic noise, the quantity and variety of noise can be increased through augmentation. Too much noise augmentation tends to make optimization difficult and can lead to worse results, and too little noise augmentation makes the system less robust to low signal-to-noise speech.

In embodiments, it is found that a good balance is to add noise to 40% of the utterances that are chosen at random. The noise sources comprise several thousand hours of randomly selected audio clips combined to produce hundreds of hours of noise.

5.3 Scaling Data

The English and Mandarin corpora used herein are substantially larger than those commonly reported in speech recognition literature. Table 10 shows the effect of increasing the amount of labeled training data on WER. This is done by randomly sampling the full dataset before training. For each dataset, the model was trained for up to 20 epochs though usually early-stopped based on the error on a held-out development set. It is noted that the WER decreases with a power law for both the regular and noisy development sets. The WER decreases by ~40% relative for each factor of 10 increase in training set size. A consistent gap is also observed in WER (~60% relative) between the regular and noisy datasets, implying that more data benefits both cases equally.

This implies that a speech system will continue to improve with more labeled training data. It is hypothesized that equally as important as increasing raw number of hours may be increasing the number of speech contexts that are captured in the dataset for embodiments. A context may be any property that makes speech unique including different speakers, background noise, environment, and microphone hardware. While the labels needed to validate this claim are not available, measuring WER as a function of speakers in the dataset may lead to much larger relative gains than simple random sampling.

TABLE 10 comparison of English WER for Regular and Noisy development sets on increasing training dataset size. The architecture is a 9-layer model with 2 layers of 2D-invariant convolution and 7 recurrent layers with 68M parameters.

| Fraction of Data | Hours | Regular Dev | Noisy Dev |
|---|---|---|---|
| 1% | 120 | 29.23 | 50.97 |
| 10% | 1200 | 13.80 | 22.99 |
| 20% | 2400 | 11.65 | 20.41 |
| 50% | 6000 | 9.51 | 15.90 |
| 100% | 12000 | 8.46 | 13.59 |

6. Results

To better assess the real-world applicability of embodiments of the speech system, a wide range of test sets were evaluated. Several publicly available benchmarks and several test sets collected internally were used. Together these test sets represent a wide range of challenging speech environments, including low signal-to-noise ratios (noisy and far-field), accented, read, spontaneous, and conversational speech.

All models that were tested were trained for 20 epochs on either the full English dataset, described in Table 9, or the full Mandarin dataset described in Section 5. Stochastic gradient descent was used with Nesterov momentum along with a minibatch of 512 utterances. If the norm of the gradient exceeds a threshold of 400, it was rescaled to 400. The model which performs the best on a held-out development set during training is chosen for evaluation. The learning rate was chosen from $[1\times10^{-4}, 6\times10^{-4}]$ to yield fastest convergence and annealed by a constant factor of 1.2 after each epoch. A momentum of 0.99 was used for all tested models.

The language models used were those described in Section 3.8. The decoding parameters from Equation 12 were tuned on a held-out development set. In embodiments, a beam size of 500 was used for the English decoder and a beam size of 200 was used for the Mandarin decoder.

6.1 English

One of the best DS2 model embodiments had 11 layers with 3 layers of 2D convolution, 7 bidirectional recurrent layers, a fully-connected output layer along with Batch Normalization. The first layer outputs to bigrams with a temporal stride of 3. By comparison an embodiment of the prior Deep Speech model had 5 layers with a single bidirectional recurrent layer and it outputs to unigrams with a temporal stride of 2 in the first layer. Results are reported on several test sets for both the DS2 and DS1 model. Neither model was tuned or adapted to any of the speech conditions in the test sets. Language model decoding parameters were set once on a held-out development set.

To put the performance of the system in context, most of the results are benchmarked against human workers, since speech recognition is an audio perception and language understanding problem that humans excel at. A measure of human level performance is obtained by paying workers from Amazon Mechanical Turk to hand-transcribe all of the test sets. Two workers transcribe the same audio clip, that is typically about 5 seconds long, and the better of the two transcriptions is used for the final WER calculation. They are free to listen to the audio clip as many times as they like. These workers are mostly based in the United States, and on average spend about 27 seconds per transcription. The hand-transcribed results are compared to the existing ground truth to produce a WER. While the existing ground truth transcriptions do have some label error, this is rarely more than 1%. This implies that disagreement between the ground truth transcripts and the human level transcripts is a good heuristic for human level performance.

6.1.1 Model Size

The English speech training set is substantially larger than the size of commonly used speech datasets. Furthermore, the data is augmented with noise synthesis. To get the best generalization error, it is expected that the model size must increase to fully exploit the patterns in the data. In Section 3.2 the effect of model depth is explored while fixing the number of parameters. In contrast, the effect of varying model size is shown on the performance of the speech system. The size of each layer is only varied, while the depth and other architectural parameters are kept constant. The models are evaluated on the same Regular and Noisy development sets used in Section 3.5.

The models in Table 11 differ from those in Table 3 in that the stride is increased to 3 and output to bigrams. Because the model size is increased to as many as 100 million parameters, it is found that an increase in stride is necessary for fast computation and memory constraints. However, in this regime it is noted that the performance advantage of the GRU networks appears to diminish over the simple RNN. In fact, for the 100 million parameter networks the simple RNN performs better than the GRU network and is faster to train despite the 2 extra layers of convolution.

TABLE 11

Comparing the effect of model size on the WER of the English speech system on both the regular and noisy development sets. the number of hidden units are varied in all but the convolutional layers. The GRU model has 3 layers of bidirectional GRUs with 1 layer of 2D-invariant convolution. The RNN model has 7 layers of bidirectional simple recurrence with 3 layers of 2D-invariant convolution. Both models output bigrams with a temporal stride of 3. All models contain approximately 35 million parameters and are trained with BatchNorm and SortaGrad.

| Model size | Model type | Regular Dev | Noisy Dev |
|---|---|---|---|
| $18 \times 10^6$ | GRU | 10.59 | 21.38 |
| $38 \times 10^6$ | GRU | 9.06 | 17.07 |
| $70 \times 10^6$ | GRU | 8.54 | 15.98 |
| $70 \times 10^6$ | RNN | 8.44 | 15.09 |
| $100 \times 10^6$ | GRU | 7.78 | 14.17 |
| $100 \times 10^6$ | RNN | 7.73 | 13.06 |

Table 11 shows that the performance of the system improves consistently up to 100 million parameters. All further English DS2 results are reported with this same 100 million parameter RNN model since it achieves the lowest generalization errors.

TABLE 12

Comparison of DS1 and DS2 WER on an internal test set of 3,300 examples. The test set contains a wide variety of speech including accents, low signal-to-noise speech, spontaneous and conversational speech:

| Test set | DS1 | DS2 |
|---|---|---|
| Baidu Test | 24.01 | 13.59 |

Table 12 shows that the 100 million parameter RNN model (DS2) gives a 43.4% relative improvement over the 5-layer model with 1 recurrent layer (DS1) on an internal Baidu dataset of 3,300 utterances that contains a wide variety of speech including challenging accents, low signal-to-noise ratios from far-field or background noise, spontaneous and conversational speech.

6.1.2 Read Speech

Read speech with high signal-to-noise ratio is arguably the easiest large vocabulary for a continuous speech recognition task. The system is benchmarked on two test sets from the Wall Street Journal (WSJ) corpus of read news articles. These are available in the LDC catalog as LDC94S13B and LDC93S6B. The recently developed LibriSpeech corpus constructed using audio books from the LibriVox project are also been take advantage.

Table 13 shows that the DS2 system outperforms humans in 3 out of the 4 test sets and is competitive on the fourth. Given this result, it is suspected that there is little room for a generic speech system to further improve on clean read speech without further domain adaptation.

TABLE 13

Comparison of WER for two speech systems and human level performance on read speech:
Read Speech

| Test set | DS1 | DS2 | Human |
|---|---|---|---|
| WSJ eval'92 | 4.94 | 3.60 | 5.03 |
| WSJ eval'93 | 6.94 | 4.98 | 8.08 |
| LibriSpeech test-clean | 7.89 | 5.33 | 5.83 |
| LibriSpeech test-other | 21.74 | 13.25 | 12.69 |

TABLE 14

Comparing WER of the DS1 system to the DS2 system on accented speech
Accented Speech

| Test set | DS1 | DS2 | Human |
|---|---|---|---|
| VoxForge American-Canadian | 15.01 | 7.55 | 4.85 |
| VoxForge Commonwealth | 28.46 | 13.56 | 8.15 |
| VoxForge European | 31.20 | 17.55 | 12.76 |
| VoxForge Indian | 45.35 | 22.44 | 22.15 |

TABLE 15

Comparison of DS1 and DS2 system on noisy speech. "CHiME eval clean" is a noise-free baseline. The "CHiME eval real" dataset is collected in real noisy environments and the "CHiME eval sim" dataset has similar noise synthetically added to clean speech. Note that only one of the six channels is used to test each utterance:
Noisy Speech

| Test set | DS1 | DS2 | Human |
|---|---|---|---|
| VoxForge American-Canadian | 15.01 | 7.55 | 4.85 |
| VoxForge Commonwealth | 28.46 | 13.56 | 8.15 |
| VoxForge Indian | 45.35 | 22.44 | 22.15 |

6.1.3 Accented Speech

The source for accented speech is the publicly available VoxForge dataset, which has clean speech read from speakers with many different accents. These accents are grouped into four categories. The American-Canadian and Indian groups are self-explanatory. The Commonwealth accent denotes speakers with British, Irish, South African, Australian and New Zealand accents. The European group contains speakers with accents from countries in Europe that do not have English as a first language. A test set is constructed from the VoxForge data with 1024 examples from each accent group for a total of 4096 examples.

Performance on these test sets is to some extent a measure of the breadth and quality of training data. Table 14 shows that the performance improved on all the accents when more accented training data are included and used an architecture that can effectively train on that data. However human level performance is still notably better than that of DS2 for all but the Indian accent.

6.1.3 Noisy Speech

The performance is tested on noisy speech using the publicly available test sets from the recently completed third CHiME challenge. This dataset has 1320 utterances from the WSJ test set read in various noisy environments, including a bus, a cafe, a street and a pedestrian area. The CHiME set also includes 1320 utterances with simulated noise from the same environments as well as the control set containing the same utterances delivered by the same speakers in a noise-free environment. Differences between results on the control set and the noisy sets provide a measure of the network's ability to handle a variety of real and synthetic noise conditions. The CHiME audio has 6 channels and using all of them can provide substantial performance improvements. A single channel is used for all the results, since multi-channel audio is not pervasive on most devices. Table 15 shows that DS2 substantially improves upon DS1, however DS2 is worse than human level performance on noisy data. The relative gap between DS2 and human level performance is larger when the data comes from a real noisy environment instead of synthetically adding noise to clean speech.

6.2 Mandarin

Table 16 compares several architectures trained on the Mandarin Chinese speech, on a development set of 2000 utterances as well as a test set of 1882 examples of noisy speech. This development set was also used to tune the decoding parameters. It can be seen from Table 16 that the deepest model with 2D-invariant convolution and Batch-Norm outperforms the shallow RNN by 48% relative, thus continuing the trend seen with the English system—multiple layers of bidirectional recurrence improves performance substantially.

It is found that the best Mandarin Chinese speech system transcribes short voice-query like utterances better than a typical Mandarin Chinese speaker. To benchmark against humans a test is run with 100 randomly selected utterances and had a group of 5 humans label all of them together. The group of humans had an error rate of 4.0% as compared to the speech systems performance of 3.7%. A single human transcriber is also compared to the speech system on 250 randomly selected utterances. In this case the speech system performs much better: 9.7% for the human compared to 5.7% for the speech model.

TABLE 16

Comparison of the improvements in Deep Speech with architectural improvements. The development and test sets are Baidu internal corpora. All the models in the table have about 80 million parameters each

| Architecture | Dev | Test |
|---|---|---|
| 5-layer, 1 RNN | 7.13 | 15.41 |
| 5-layer, 3 RNN | 6.49 | 11.85 |
| 5-layer, 3 RNN + BatchNorm | 6.22 | 9.39 |
| 9-layer, 7 RNN + BatchNorm + 2D conv | 5.81 | 7.93 |

7. Deployment

Real-world applications usually require a speech system to transcribe in real time or with relatively low latency. The system used in Section 6.1 is not well-designed for this task, for several reasons. First, since the RNN has several bidirectional layers, transcribing the first part of an utterance requires the entire utterance to be presented to the RNN. Second, since a wide beam is used when decoding with a language model, beam search can be expensive, particularly in Mandarin where the number of possible next characters is very large (around 6000). Third, as described in Section 3, power across an entire utterance is normalized, which again requires the entire utterance to be available in advance.

The power normalization problem is solved by using some statistics from training set to perform an adaptive normalization of speech inputs during online transcription. The other problems can be solved by modifying the network and decoding procedure to produce a model that performs almost as well while having much lower latency. The Mandarin system is focused since some aspects of that system are more challenging to deploy (e.g. the large character set), but the same techniques could also be applied in English.

In this section, latency refers to the computational latency of the speech system as measured from the end of an utterance until the transcription is produced. This latency does not include data transmission over the internet, and does not measure latency from the beginning of an utterance until the first transcription is produced. Latency from end of utterance to transcription is focused because it is important to applications using speech recognition.

7.1 Batch Dispatch

In order to deploy relatively large deep neural networks at low latency, special attention has been paid to efficiency during deployment. Most internet applications process requests individually as they arrive in the data center. This makes for a straightforward implementation where each request can be managed by one thread. However, processing requests individually is inefficient computationally, for two main reasons. Firstly, when processing requests individually, the processor must load all the weights of the network for each request. This lowers the arithmetic intensity of the workload, and tends to make the computation memory bandwidth bound, as it is difficult to effectively use on-chip caches when requests are presented individually. Secondly, the amount of parallelism that can be exploited to classify one request is limited, making it difficult to exploit SIMD or multi-core parallelism. RNNs are especially challenging to deploy because evaluating RNNs sample by sample relies on sequential matrix vector multiplications, which are bandwidth bound and difficult to parallelize.

To overcome these issues, a batching scheduler called Batch Dispatch is built that assembles streams of data from user requests into batches before performing forward propagation on these batches. In this case, there is a tradeoff between increased batch size, and consequently improved efficiency, and increased latency. The more user requests buffered to assemble a large batch, the longer users must wait for their results. This places constraints on the amount of batching that can be performed.

An eager batching scheme is used that processes each batch as soon as the previous batch is completed, regardless of how much work is ready by that point. This scheduling algorithm has proved to be the best at reducing end-user latency, despite the fact that it is less efficient computationally, since it does not attempt to maximize batch size.

Figure 14:
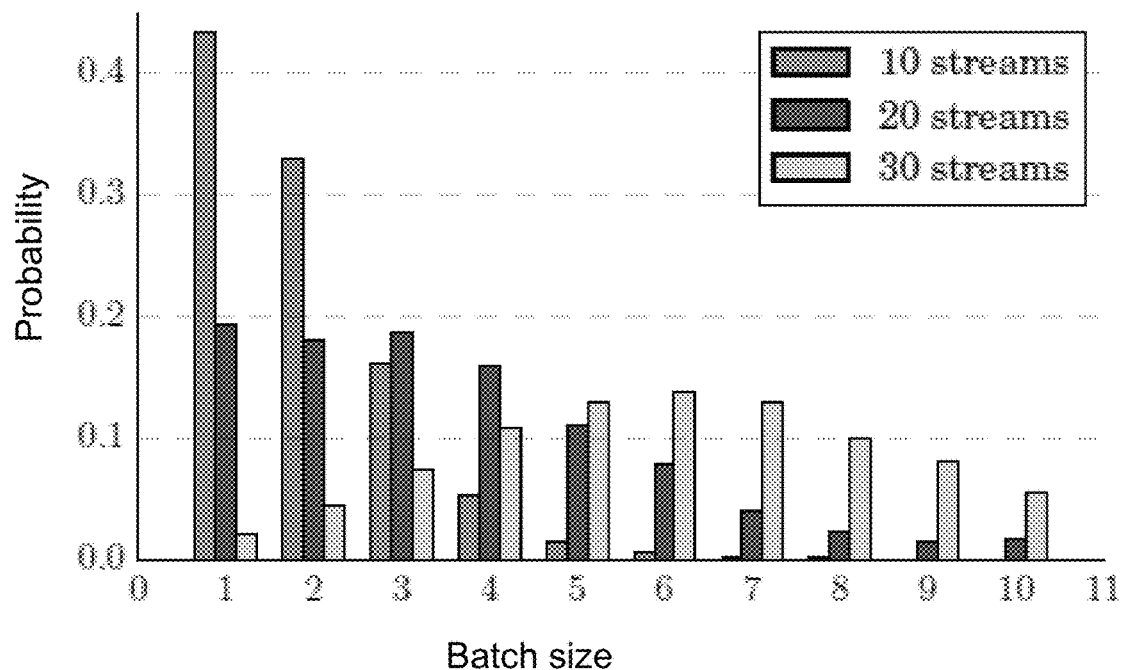
FIG. 14 depicts probability that a request is processed in a batch of given size according to embodiments of the present disclosure.

FIG. 14 shows the probability that a request is processed in a batch of given size for production system running on a single NVIDIA Quadro K1200 GPU, with 10-30 concurrent user requests. As expected, batching works best when the server is heavily loaded: as load increases, the distribution shifts to favor processing requests in larger batches. However, even with a light load of only 10 concurrent user requests, the system performs more than half the work in batches with at least 2 samples.

Figure 15:
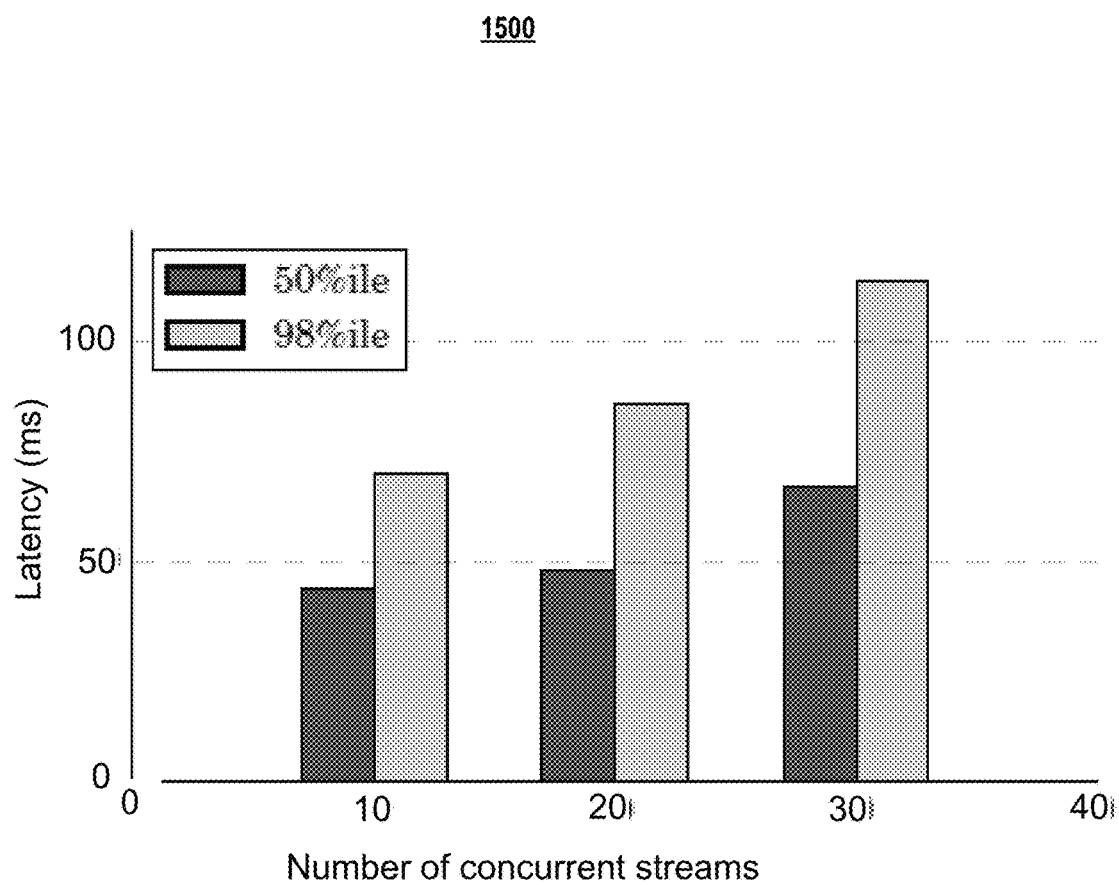
FIG. 15 depicts median and 98 percentile latencies as a function of server load according to embodiments of the present disclosure.
Figure 16:
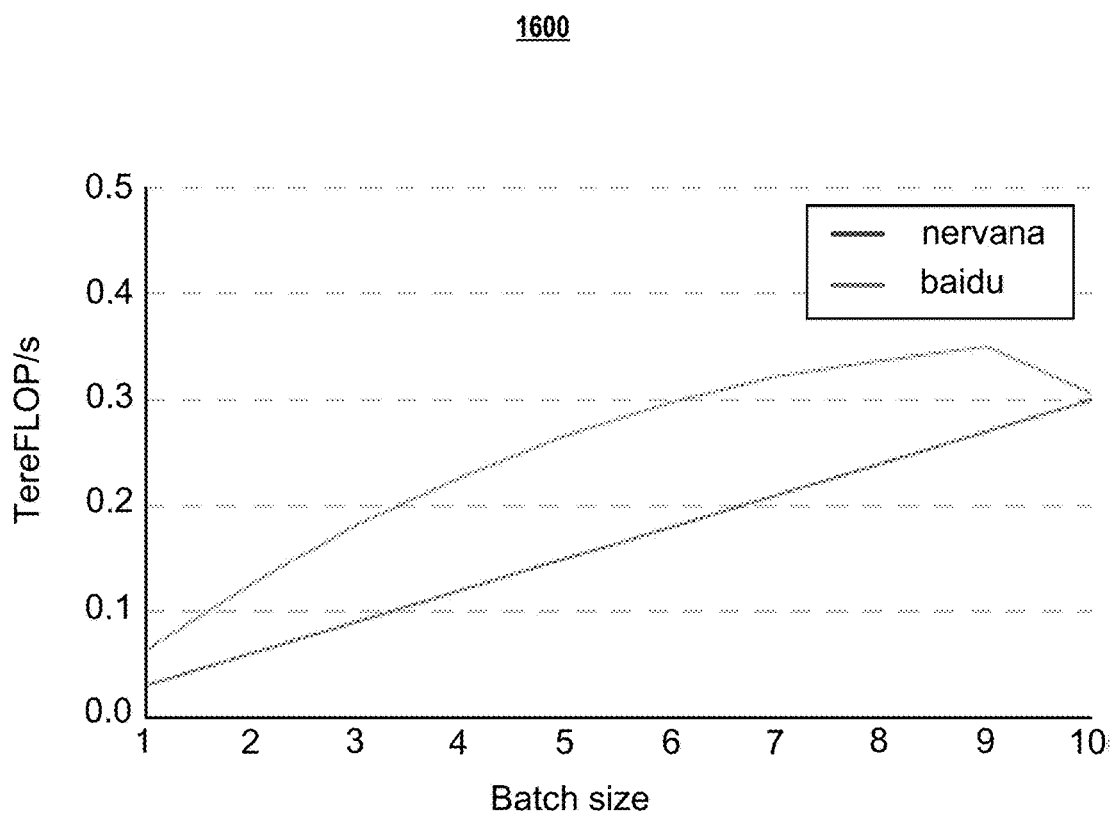
FIG. 16 depicts comparison of kernels according to embodiments of the present disclosure.

FIG. 15 depicts median and 98 percentile latencies as a function of server load according to embodiments of the present disclosure. It can be seen from FIG. 15 that the system achieves a median latency of 44 ms, and a 98 percentile latency of 70 ms when loaded with 10 concurrent streams. As the load increases on the server, the batching scheduler shifts work to more efficient batches, which keeps latency low. This shows that Batch Dispatch makes it possible to deploy these large models at high throughput and low latency.

Presented below are example implementations for a general and challenging case that involves classifying a streaming input comprising an ordered sequence of packets of fixed or variable length, while satisfying a latency constraint. In embodiments, non-streaming inputs may be handled in a similar same manner by designating each packet as the last packet of a (trivial) stream.

As used herein, the terms "request," "user request," "data processing request," "stream," "streaming input," and "stream of data" are used interchangeably. The term "user" is associated with a "stream" in that each stream is associated with a single user. The term "chunk" refers to a size of data related to a neural network input size. The terms "packet" shall be understood to mean a group of data that can be transported across a network. The term "packet" shall not be interpreted as limiting embodiments of the present invention to Ethernet or Layer 3 networks. The terms "packet," "frame," "data," "datagram," "cell," or "data traffic" may be used interchangeably and may be replaced by other terminologies referring to a set of data.

While it is assumed that a neural network model is used to process the data, one skilled in the art will appreciate that other techniques, models, or networks may be employed to process data in accordance with the embodiments of the present disclosure.

"Data" refers to any of a number of types of input data. For example, when transcribing an utterance in a speech setting, each packet may represent a few milliseconds (e.g., 80 ms) of audio. In a video context, each packet may represent the difference between a current image and a previous image. In image recognition, each packet may represent a tile of a complete image.

In embodiments, a latency constraint may state that a complete stream be processed in a fixed amount of time after the arrival of the last packet in the stream. This may be expressed as:

$$T_{whole\ stream\ processed} < T_{arrival\ of\ last\ packet} + \Delta_{acceptable\ delay},$$

where $T_{whole\ stream\ processed}$ denotes the time at which processing of the whole stream should be completed, $T_{arrival\ of\ last\ packet}$ denotes the arrival time of the last packet, and $\Delta_{acceptable\ delay}$ denotes the application-dependent acceptable delay. In an online setting, where latency is typically quite critical, $\Delta_{acceptable\ delay}$ is likely to be less than 1 second.

In embodiments, one goal may be to process as many streams concurrently as possible, while satisfying a latency constraint (e.g., maintain high throughput). In comparison, existing approaches handle each stream individually and independently in order to ensure low latency and maintain flexibility.

In embodiments of the present disclosure, a model/architecture is employed in which a plurality of requests is simultaneously piped through to a compute engine that implements the neural network. In embodiments, a batching method is used to allow a neural network to process data for multiple simultaneous users in a similar fashion as processing data for a single user. In embodiments, a batching method commences with a batch producer accepting (e.g., in an asynchronous manner) data processing requests comprising packets that are associated with a plurality of users. The packets may arrive in streams that each are associated with a user. The packets may arrive, for example, via a load-balancer that load-balances streams of data from a plurality of users. In embodiments, the arrival times of the packets may be unknown and subject to application-level constraints, such as latency constraints, performance characteristics of the compute engine, and the like.

In embodiments, a batch producer dynamically assembles the data from requests, within the application-level constraints, into a batch that comprises data from one or more requests, e.g., stateful requests.

In embodiments, the batch is processed using a common neural network (e.g., to perform classification on an audio stream) that is loaded to and/or from memory only once to reduce the computational latency requirement, thereby, increasing the throughput of the streams of data.

In embodiments, results, such as the results of a classification, are output. As a result, memory bandwidth is conserved and computational efficiency is increased.

In embodiments, the batch producer runs in a single thread, and has the task of:
a) pre-processing the data;
b) packing the pre-processed data into a batch matrix that is shared by many users; and
c) forwarding the batch matrix to the compute engine.

In embodiments, the batch producer maintains three types of data structures:
1) an input buffer for each user;
2) a pre-processed buffer for each user; and
3) a linked list of batches (i.e., matrix inputs to the neural network), which may be denoted as the batch list. In applications such as speech or video processing, the neural network may process the batches in a predetermined order to ensure that the compute engine produces a correct output. In embodiments, batches may be shared between two or more users. In embodiments, pre-processing may not be performed.

Presented below is an exemplary batching method using pre-processing in accordance with embodiments of the present disclosure. In embodiments, the batching method commences when a packet for a particular user arrives at the batch producer. In embodiments, the data is copied to an input buffer for that user, and the packet may then be discarded. In embodiments, the input buffer is pre-processed. Examples of pre-processing are converting audio signals to spectrograms and other processing. In embodiments, pre-processing may not be performed.

Once pre-processing is completed, in embodiments, the results are placed in a pre-processed buffer for that user. In some applications, the pre-processing may take place in chunks of data. For example, speech systems frequently use spectrograms that require fixed-sized input windows of speech. As a result, in embodiments, it may not be guaranteed that the packet for a user can be pre-processed without data from future packets.

In embodiments, if the pre-processed buffer is at least as large as the input required by the neural network, a chunk (whose size may be determined by the neural network input size) is transferred from the pre-processed buffer to the next eligible batch in the batch list. In embodiments, for a batch to be eligible, it should not already contain any data being processed for the current user. In embodiments, the size of the batch is limited such that full batches are also not be eligible. In image or video recognition applications, a chunk may represent a full image, and in speech recognition applications, a chunk may represent a fixed length of the input spectrogram.

In embodiments, the batch producer may loop over all active users to fill up the batch.

In embodiments, the batch producer may then decide whether to send one or more batches to the compute engine. In embodiments, there may be several ways to make a decision:

1) One simple approach is to send a batch only if the compute engine is not busy.

2) Another, more structured approach is to send a batch if one of the following conditions is satisfied:
  a) The batch contains data for a user, whose last packet has arrived, and the processing time for the compute engine plus the time needed for an extra iteration through the batch producer would exceed the delay constraint.
  b) The batch list is sufficiently full, such that if the last packet for any active user were to arrive now, it would not be possible to satisfy the latency constraint.

In embodiments, to be able to implement the latter approach, reasonably accurate bounds on processing times for different parts of the system may be necessary. For greater efficiency, in embodiments, the batch producer may assemble both latency-sensitive batches, which may run at a higher priority but lower computational efficiency in order to satisfy latency constraints, and larger but more efficient throughput-oriented batches that handle the majority of the computational work. In embodiments, the batch producer continues looping until the process is terminated.

Additional discussion of batching using a Batch Dispatch can be found in commonly assigned U.S. patent application Ser. No. 15/209,499, filed on Jul. 13, 2016, entitled "SYSTEMS AND METHODS FOR EFFICIENT NEURAL NETWORK DEPLOYMENTS" and listing Christopher Fougner and Bryan Catanzaro as inventors. The aforementioned patent document is herein incorporated by reference as to its entire content.

7.2 Deployment Optimized Matrix Multiply Kernels

It is found that deploying the models using half-precision (16-bit) floating-point arithmetic does not measurably change recognition accuracy. Because deployment does not require any updates to the network weights, it is far less sensitive to numerical precision than training. Using half-precision arithmetic saves memory space and bandwidth, which is especially useful for deployment, since RNN evaluation is dominated by the cost of caching and streaming the weight matrices.

As seen in Section 7.1, the batch size during deployment is much smaller than in training. It is found that standard BLAS libraries are inefficient at this batch size. To overcome this, a half-precision matrix-matrix multiply kernel is written. For 10 simultaneous streams over 90 percent of batches are for N≤4, a regime where the matrix multiply will be bandwidth bound. A matrix is stored transposed to maximize bandwidth by using the widest possible vector loads while avoiding transposition after loading. Each warp computes four rows of output for all N output columns. Note that for N≤4 the B matrix fits entirely in the L1 cache. This scheme achieves 90 percent of peak bandwidth for N≤4 but starts to lose efficiency for larger N as the B matrix stops fitting into the L1 cache. Nonetheless, it continues to provide improved performance over existing libraries up to N=10.

FIG. 14 shows that the deployment kernel sustains a higher computational throughput than those from Nervana Systems on the K1200 GPU, across the entire range of batch sizes being used in deployment. The kernels are used to compute Ax=b where A is a matrix with dimension 2560×2560, and x is a matrix with dimension 2560×Batch size, where Batch size ∈[1, 10]. All matrices are in half-precision forma. Both the kernels and the Nervana kernels are significantly faster than NVIDIA CUBLAS version 7.0, more details are found here.

7.3 Beam Search

Performing the beam search involves repeated lookups in the n-gram language model, most of which translate to uncached reads from memory. The direct implementation of beam search means that each time-step dispatches one lookup per character for each beam. In Mandarin, this results in over 1M lookups per 40 ms stride of speech data, which is too slow for deployment. To deal with this problem, a heuristic is used to further prune the beam search. Rather than considering all characters as viable additions to the beam, the fewest number of characters whose cumulative probability is at least p are considered only. In practice, it is found that p=0.99 works well. Additionally, the number is limited to no more than 40 characters. This speeds up the Mandarin language model lookup time by a factor of 150×, and has a negligible effect on the CER (0.1-0.3% relative).

7.4 Results

The system can be deployed at low latency and high throughput without sacrificing much accuracy. On a held-out set of 2000 utterances, the research system achieves 5.81 character error rate whereas the deployed system achieves 6.10 character error rate. This is only a 5% relative degradation for the deployed system. In order to accomplish this, a neural network architecture with low deployment latency is employed, the precision of the network is reduced to 16-bit, a batching scheduler is built to more efficiently evaluate RNNs, and a simple heuristic is found to reduce beam search cost. The model has five forward-only recurrent layers with 2560 hidden units, one row convolution layer (Section 3.7) with τ=19, and one fully-connected layer with 2560 hidden units. These techniques allow deploying Deep Speech at low cost to interactive applications.

8. Scalability improvements

8.1 Node and Cluster Architecture

The software stack runs on a compute dense node built from 2 Intel CPUs and 8 NVIDIA Titan X GPUs, with peak single-precision computational throughput of 53 teraFLOP/second. Each node also has 384 GB of CPU memory and an 8 TB storage volume built from two 4 TB hard disks in RAID-0 configuration. The CPU memory is used to cache the input data so that it is not directly exposed to the low bandwidth and high latency of spinning disks. The English and Mandarin datasets are replicated on each node's local hard disk. This allows using the network only for weight updates and avoids having to rely on centralized file servers.

Figure 17:
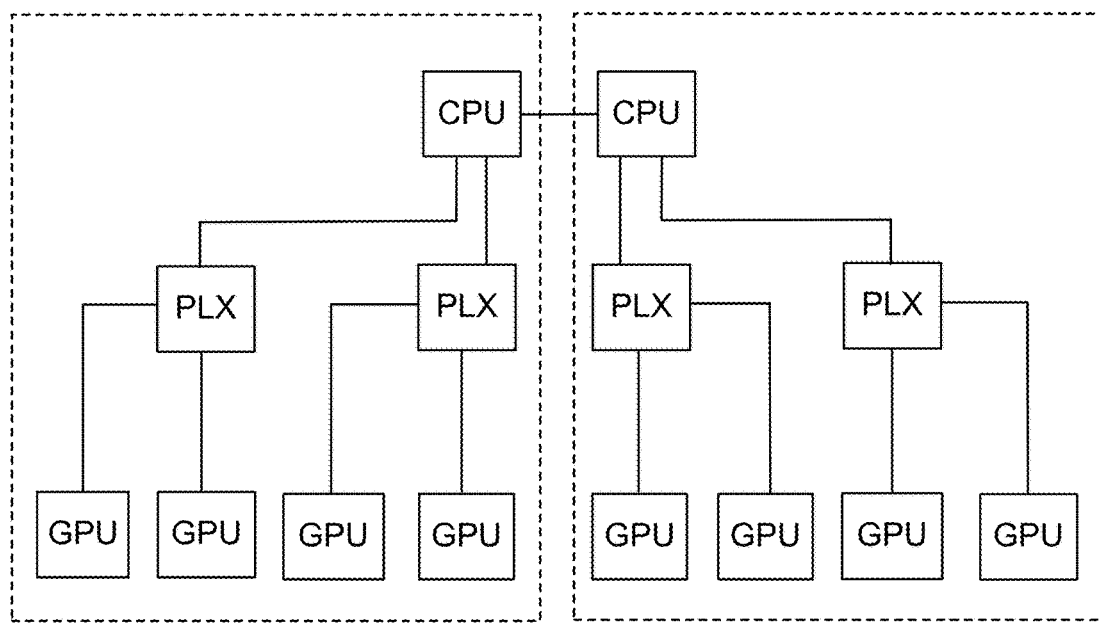
FIG. 17 depicts a schematic diagram of a training node where PLX indicates a PCI switch and the dotted box includes all devices that are connected by the same PCI root complex according to embodiments of the present disclosure.

FIG. 17 shows a schematic diagram of one of the nodes, where all devices connected by the same PCI root complex are encapsulated in a dotted box. GPUDirect has been tried to maximize the number of GPUs within the root complex for faster communication between GPUs. This allows using an efficient communication mechanism to transfer gradient matrices between GPUs.

All the nodes in the cluster are connected through Fourteen Data Rate (FDR) Infiniband which is primarily used for gradient transfer during back-propagation.

8.2 GPU Implementation of CTC Loss Function

In embodiments, one of the scalability improvements included embodiments of GPU implementation of CTC loss function. These embodiments were discussed in Section 4.2, above.

9. Conclusions

End-to-end deep learning presents the exciting opportunity to improve speech recognition systems continually with increases in data and computation. Indeed, results show that, Deep Speech 2 embodiments have significantly closed the gap in transcription performance with human workers by leveraging more data and larger models. Further, since the approach is highly generic, it has been shown that it can quickly be applied to new languages. Creating high-performing recognizers for two very different languages, English and Mandarin, required essentially no expert knowledge of the languages. Finally, it is also shown that, in embodiments, this approach can be efficiently deployed by batching user requests together on a GPU server, paving the way to deliver end-to-end Deep Learning technologies to users.

In embodiments, to achieve these results, various network architectures were explored, several effective techniques were developed, including, by way of example: enhancements to numerical optimization through SortaGrad and Batch Normalization, evaluation of RNNs with larger strides with bigram outputs for English, searching through both bidirectional and unidirectional models. This exploration was powered by a well optimized, High Performance Computing inspired training system that allows training new, full-scale models on large datasets in just a few days.

Overall, it is believed that the results confirm and exemplify the value of end-to-end Deep Learning methods for speech recognition in several settings. In those cases where the system is not already comparable to humans, the difference has fallen rapidly, largely because of application-agnostic Deep Learning techniques. It is believed that these techniques will continue to scale, and thus conclude that the vision of a single speech system that outperforms humans in most scenarios is imminently achievable.

Figure 18:
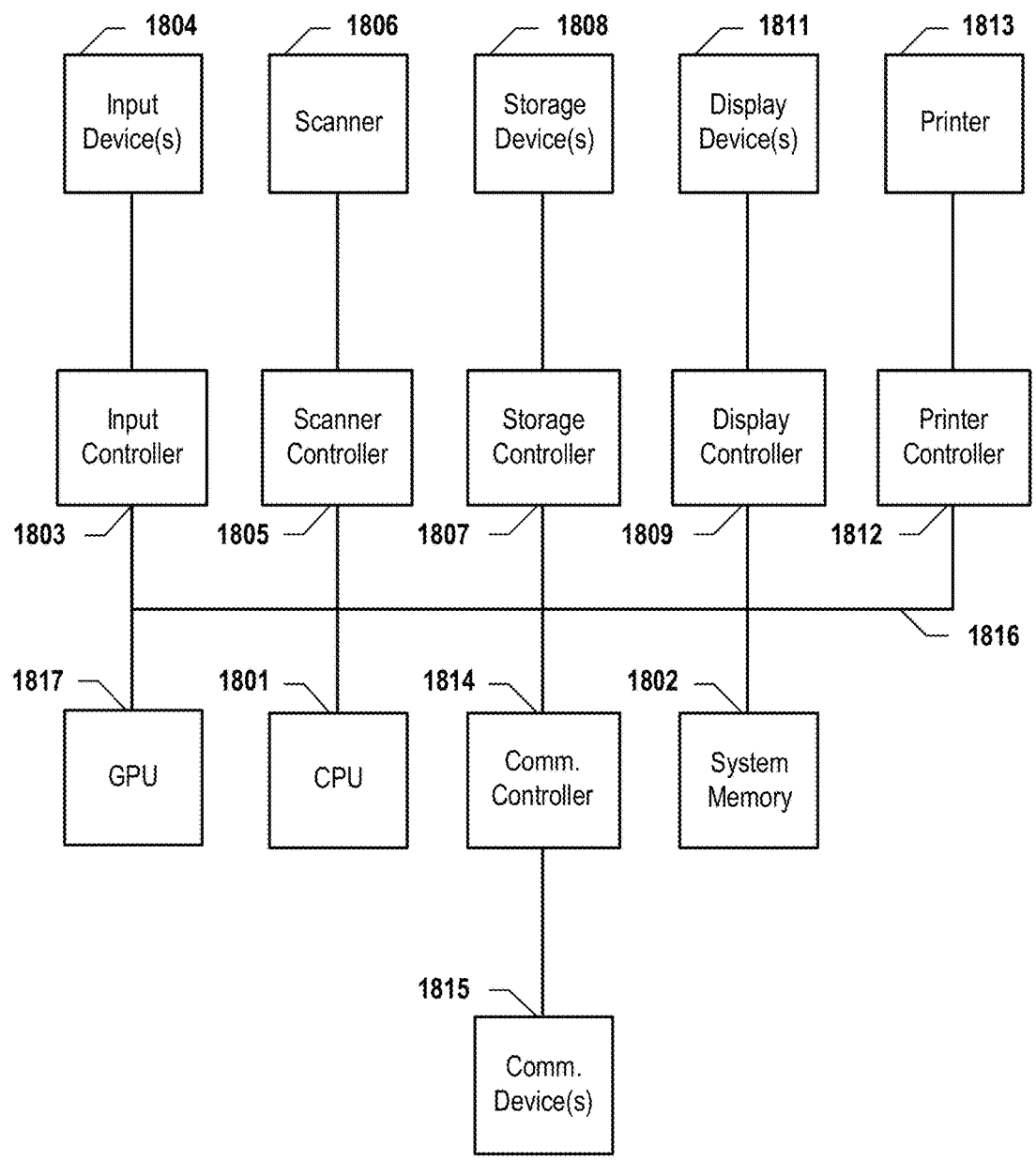
FIG. 18 depicts a simplified block diagram of a computing system according to embodiments of the present disclosure.

FIG. 18 depicts a block diagram of a computing system 1800 according to embodiments of the present invention. It will be understood that the functionalities shown for system 1800 may operate to support various embodiments of a computing system—although it shall be understood that a computing system may be differently configured and include different components. As illustrated in FIG. 18, system 1800 includes one or more central processing units (CPU) 1801 that provides computing resources and controls the computer. CPU 1801 may be implemented with a microprocessor or the like, and may also include one or more graphics processing units (GPU) 1817 and/or a floating point coprocessor for mathematical computations. System 1800 may also include a system memory 1802, which may be in the form of random-access memory (RAM), read-only memory (ROM), or both.

A number of controllers and peripheral devices may also be provided, as shown in FIG. 18. An input controller 1803 represents an interface to various input device(s) 1804, such as a keyboard, mouse, or stylus. There may also be a scanner controller 1805, which communicates with a scanner 1806. System 1800 may also include a storage controller 1807 for interfacing with one or more storage devices 1808 each of which includes a storage medium such as magnetic tape or disk, or an optical medium that might be used to record programs of instructions for operating systems, utilities, and applications, which may include embodiments of programs that implement various aspects of the present invention. Storage device(s) 1808 may also be used to store processed data or data to be processed in accordance with the invention. System 1800 may also include a display controller 1809 for providing an interface to a display device 1811, which may be a cathode ray tube (CRT), a thin film transistor (TFT) display, or other type of display. The computing system 1800 may also include a printer controller 1812 for communicating with a printer 1813. A communications controller 1814 may interface with one or more communication devices 1815, which enables system 1800 to connect to remote devices through any of a variety of networks including the Internet, an Ethernet cloud, an Fibre Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 1816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

It shall also be noted that elements of the claims, below, may be arranged differently including having multiple dependencies, configurations, and combinations. For example, in embodiments, the subject matter of various claims may be combined with other claims.

What is claimed is:

1. A computer-implemented method for training a deep neural network (DNN) transcription model for speech transcription, the method comprising:
    obtaining a set of spectrogram frames from each utterance from a set of utterances, the utterance having an associated ground-truth label, the utterance and the associated ground-truth label being from a training set used to form a plurality of minibatches;
    in at least a first training epoch, iterating through the training set in increasing order of a difficulty metric of the utterances, and after the at least a first training epoch, allowing the utterances to be in a different order;
    wherein training comprises:
        outputting from the deep neural network (DNN) transcription model a predicted character or character probabilities for the utterance, the DNN transcription model comprising one or more convolution layers and a plurality of recurrent layers, a batch normalization being applied for one or more minibatches of the plurality of minibatches to normalize pre-activations in at least one of the plurality of recurrent layers to improve optimization of the DNN transcription model during training of the DNN transcription model;

computing a loss to measure an error in prediction of a character for the utterance given the associated ground-truth label;

computing a derivative of the loss with respect to at least some parameters of the DNN transcription model; and updating the DNN transcription model using the derivative through back-propagation.

2. The computer-implemented method of claim 1 wherein the batch normalization is also implemented in one or more convolution layers.

3. The computer-implemented method of claim 2 wherein the normalization comprises, for each layer to be batch normalized, computing a mean and variance over the length of an utterance sequence in a minibatch for the hidden units for the layer.

4. The computer-implemented method of claim 1 wherein subsampling the utterance is implemented in obtaining the set of spectrogram frames by taking strides of a step size of predetermined number of time slices.

5. The computer-implemented method of claim 4 wherein the predicted character from the transcription model is selected from a model alphabet comprising the English alphabet and symbols representing alternate labellings selected from one or more of whole words, syllables, and non-overlapping n-grams.

6. The computer-implemented method of claim 5 wherein the alternate labellings comprise non-overlapping n-grams, which allow the DNN transcription model to reduce a number of time steps required to model an utterance.

7. The computer-implemented method of claim 5 wherein the non-overlapping n-grams are non-overlapping bigrams obtained from words at word level.

8. The computer-implemented method of claim 7 wherein for a word with an odd number of characters, a last character of the word is a unigram.

9. The computer-implemented method of claim 1 wherein the difficulty metric is length of the utterance and in the at least a first training epoch the utterances of the training set are in an increasing order of the length of the utterance.

10. The computer-implemented method of claim 1 wherein the training set is generated from raw audio clips and raw transcriptions through a data acquisition pipeline.

11. The computer-implemented method of claim 10 wherein generating the training set comprises the following steps:

aligning the raw audio clips and raw transcriptions;

segmenting the aligned audio clips and the corresponding transcriptions whenever the audio encounters a series of consecutive blank labels occurs; and filtering the segmented audio clips and corresponding transcriptions by removing erroneous examples.

12. A computer-implemented method for training a deep neural network (DNN) model for speech transcription, the method comprising:

generating an organized training set of utterances by arranging utterances of a training set of utterances in increasing order of a difficulty metric;

for at least a first epoch, training the DNN model by using the organized training set that has the utterances of the training set arranged in increasing order of the difficulty metric by performing the steps comprising:

receiving, at a first layer of the DNN model, a set of spectrogram frames corresponding to a plurality of utterances, the plurality of utterance and associated labels being from the training set;

applying convolutions in at least one of frequency and time domains, in one or more convolution layers of the DNN model, to the set of spectrogram frames;

inputting an output of the one or more convolution layers to one or more recurrent layers of the DNN model, a batch normalization being implemented to normalize pre-activations in at least one of the one or more recurrent layers;

obtaining a probability distribution over predicted characters in an output layer of the DNN model; and implementing a Connectionist Temporal Classification (CTC) loss function to measure an error in prediction of a character for an utterance given the associated ground-truth label, the CTC loss function implementation comprising obtaining a matrix by combining a forward matrix and a backward matrix generated during forward and backward passes of the CTC loss function, respectively;

computing a gradient with respect to at least some parameters of the DNN model using the matrix from the combining of the forward matrix and the backward matrix; and updating the DNN model using the gradient.

13. The computer-implemented method of claim 12 wherein the normalization comprises, for each recurrent layer to be batch normalized, computing a mean and variance over the length of each utterance for the recurrent layers.

14. The computer-implemented method of claim 12 wherein the CTC loss function is implemented in log probability space.

15. The computer-implemented method of claim 12 wherein the CTC loss function is implemented is a graphics processing unit (GPU) based implementation.

16. The computer-implemented method of claim 15 wherein the CTC loss function algorithm implementation further comprises mapping the forward and backward passes to corresponding compute kernels.

17. A non-transitory computer-readable medium or media comprising one or more sequences of instructions which, when executed by one or more processors, causes the steps to be performed comprising:

receiving a plurality of batches of utterance sequences, each utterance sequence and associated label being obtained from a training set, and wherein for at least a first training epoch, the utterance sequences in the plurality of batches of utterance sequences are ordered in an increasing order of a difficulty metric of the utterances, and after the at least a first training epoch, the utterance sequences in the plurality of batches of utterance sequences are not required to be ordered in an increasing order of the difficulty metric;

outputting a probability distribution over characters corresponding to the utterance sequences to a Connectionist Temporal Classification (CTC) layer; and training a deep neural network for speech transcription using a CTC loss function implementation, the implementation comprising obtaining a matrix from element-wise addition of a forward matrix and a backward matrix generated during a forward pass and a backward pass of the CTC loss function, respectively, and computing a gradient by taking each column of the matrix generated from element-wise addition of the forward and backward matrices and performing a key-value reduction using characters as keys.

18. The non-transitory computer-readable medium or media of claim 17 wherein the steps further comprise mapping each utterance sequence in the plurality of batches to a compute thread block.

19. The non-transitory computer-readable medium or media of claim 18 wherein rows of the forward matrix and the backward matrix are processed in parallel by the compute thread block, columns of the forward matrix and the backward matrix are processed sequentially by the compute thread block.

20. The non-transitory computer-readable medium or media of claim 17 wherein the steps further comprise mapping the forward pass and backward pass to a forward compute kernel and a backward compute kernel, respectively.

* * * * *